United States Patent

Tomita et al.

[11] Patent Number: 6,088,358
[45] Date of Patent: Jul. 11, 2000

[54] ATM EXCHANGE

[75] Inventors: Hiroya Tomita; Masataka Waseda; Takashi Kato, all of Fukuoka, Japan

[73] Assignee: Fujitsu Limited, Kanagawa, Japan

[21] Appl. No.: 08/734,528

[22] Filed: Oct. 21, 1996

[30] Foreign Application Priority Data

Oct. 31, 1995 [JP] Japan .................................. 7-283605

[51] Int. Cl.$^7$ ....................................................... H04J 3/16
[52] U.S. Cl. .......................................... 370/395; 370/468
[58] Field of Search .................................. 370/395, 389, 370/396, 252, 398, 253, 227, 228, 468, 229, 230, 231, 235; 379/210, 211, 212, 204, 207

[56] References Cited

U.S. PATENT DOCUMENTS

| | | | |
|---|---|---|---|
| 5,258,979 | 11/1993 | Oomuro et al. | 370/395 |
| 5,481,602 | 1/1996 | Griffiths et al. | 370/211 |
| 5,661,721 | 8/1997 | Hosoda et al. | 370/395 |

*Primary Examiner*—Chi H. Pham
*Assistant Examiner*—Steven Nguyen
*Attorney, Agent, or Firm*—Helfgott & Karas, P.C.

[57] ABSTRACT

When some terminal makes a connection request to a first terminal, a control apparatus of an ATM exchange refers to a band management table to check if this first terminal is busy. When the first terminal is busy, the control apparatus executes a call connection process of establishing connection to the first terminal. When the first terminal is not busy, the control apparatus reads a substitute terminal for the first terminal from a registration table and executes a connection process for this substitute terminal.

7 Claims, 29 Drawing Sheets

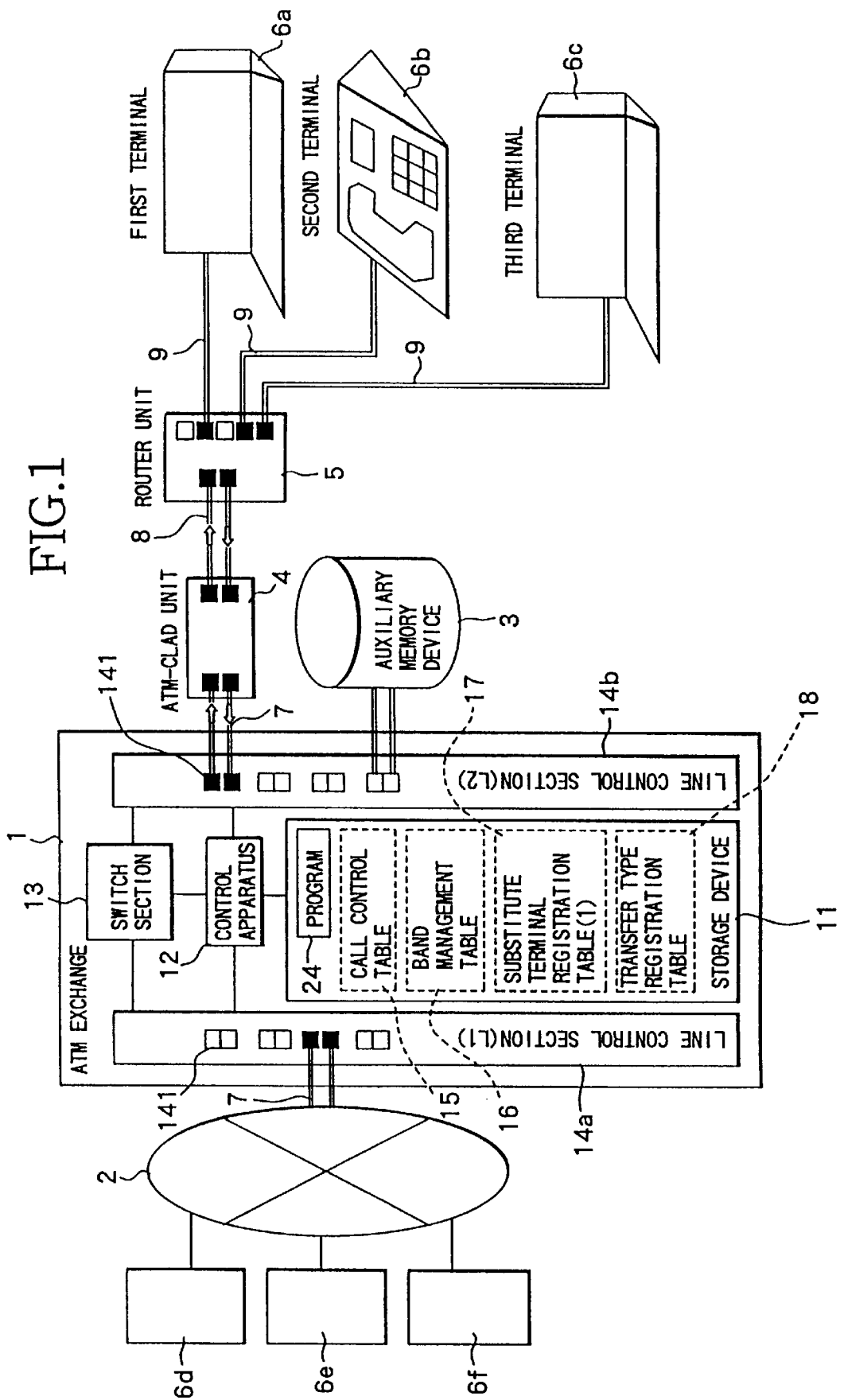

FIG.2

CALL NUMBER

| | |
|---|---|
| CALLING TERMINAL NUMBER | (EX. :500) |
| USED BANDWIDTH | (EX. :30Mbps) |
| RECEIVING TERMINAL NUMBER | (EX. :502) |
| USED BANDWIDTH | (EX. :30Mbps) |
| CALLING PORT NUMBER | (EX. :13) |
| CALLING VPI | (EX. :50) |
| CALLING VCI | (EX. :505) |
| RECEIVING PORT NUMBER | (EX. :10) |
| RECEIVING VPI | (EX. :10) |
| RECEIVING VCI | (EX. :105) |
| TRANSFER TERMINAL NUMBER | (EX. :500) |
| RECEIVING TIME | (EX. :5:15:00) |
| SUBSTITUTE TERMINAL NUMBER | (EX. :300) |
| SIMULTANEOUS COMMUNICATION DESTINATION TERMINAL NUMBER | (EX. :100) |

ONE UNIT FOR EACH CALL

FIG.24

| TERMINAL NUMBER | |
|---|---|
| TRANSFER START TIME | (EX. :08:30:00) |
| TRANSFER END TIME | (EX. :08:40:00) |
| TRANSFER DESTINATION | (EX. :500) |
| ⋮ | |
| TRANSFER START TIME | (EX. :12:00:00) |
| TRANSFER END TIME | (EX. :13:00:00) |
| TRANSFER DESTINATION | (EX. :500) |

ONE UNIT encompasses the transfer start time through transfer destination entries.

ATM EXCHANGE

BACKGROUND OF THE INVENTION

1. Field of the Invention

The present invention relates to an ATM (Asynchronous Transfer Mode) exchange, and, more particularly, to an ATM exchange which can connect a terminal requesting connection (hereinafter called "connection requesting terminal") to a terminal other than a terminal which is the target for the requested connection (hereinafter called "connection requested terminal") when the connection requesting terminal cannot be connected to the connection requested terminal.

2. Description of the Related Art

An ATM exchange holds a network having a plurality of terminals connected thereto or directly accommodates terminals, and connects a connection requesting terminal to a connection requested terminal by executing predetermined call connection procedures in response to a call connection request made by the connection requesting terminal. This call connection procedures are performed based on call transfer conditions given from the connection requesting terminal (calling terminal) or a network, such as the required bandwidth and the identifier (ID) of the connection requested terminal. Specifically, the ATM exchange connects the connection requesting terminal to the connection requested terminal only when the bandwidth which satisfies the given call transfer conditions can be secured. This connecting scheme is generally called "receiving control."

When such terminating control result in a failure to secure the bandwidth which satisfies the given call transfer conditions, the ATM exchange cannot connect the connection requesting terminal to the connection requested terminal. In such a case, however, the purpose of communication intended by the user of the connection requesting terminal (caller) may be achieved even when the connection requesting terminal is connected to a terminal other than the intended connection requested terminal. For medical cases, for example, when the terminal of one patient requests connection to a terminal on an intended medical organization X but is not connected to such a terminal, the terminal of the patient would be better connected to a terminal of another medical organization Y than not connected at all.

SUMMARY OF THE INVENTION

Accordingly, it is an object of the present invention to provide an ATM exchange which can connect a connection requesting terminal to a substitute terminal even when no call connection can be made to a designated connection requested terminal.

To achieve this object, according to this invention, there is provided an ATM exchange connected to a plurality of transmission paths connected to respective terminals, which comprise a switch section having a communication path set therein to connect one terminal to another and transmitting a cell sent from the one terminal to the another terminal through the communication path;

a substitute terminal registration table having registered a second terminal to be substitute for a first terminal as a substitute terminal; and a control section, in a case that a third terminal requests to set said communication path to said first terminal as a destination, for connecting the communication path between a third terminal and the first terminal when setting of the communication path for connection of the third terminal to the first terminal is possible, and for connecting the communication path between the third terminal and the second terminal registered in the substitute terminal registration table when setting of the communication path to the first terminal is not possible.

BRIEF DESCRIPTION OF THE DRAWINGS

The present invention will become more fully understood from the detailed description given hereinbelow and the accompanying drawings in which:

FIG. 1 is a block diagram illustrating the structure of a communication network in which an ATM exchange according to the first embodiment of this invention is used;

FIG. 2 is a structural diagram of a call control table shown in FIG. 1;

FIG. 24 is a structural diagram of a transfer time registration table shown in FIG. 23;

DETAILED DESCRIPTION OF THE PREFERRED EMBODIMENTS

Figure 3:
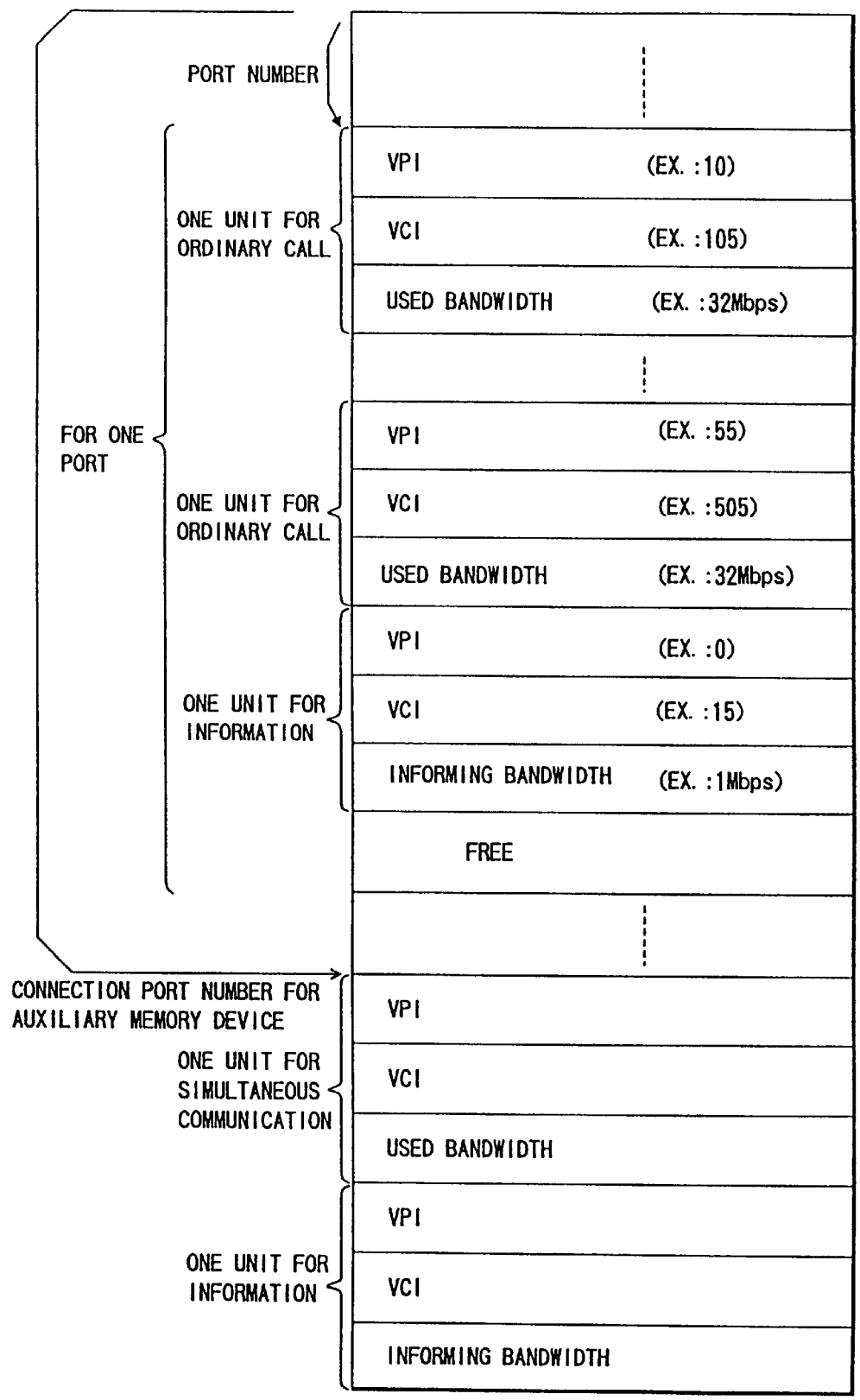
FIG. 3 is a structural diagram of a band management table shown in FIG. 1.

Preferred embodiments of the present invention will now be described with reference to the accompanying drawings.

First Embodiment
Structure of Communication System

FIG. 1 presents a block diagram illustrating the structure of a communication network in which an ATM exchange according to the first embodiment of this invention is used. As illustrated, an ATM exchange 1 according to this embodiment is connected to an ATM-CLAD (Cell Assembly and Dissembly) unit 4 via a transmission path 7 of a SONET (Synchronous Optical Network) having a capacity equivalent to 156 Mbps. This ATM-CLAD unit 4 is connected to a router unit 5 via fast serial interface 8. Several terminals 6 (6a, 6b and 6c) are connected to this router unit 5 via an Ether net 9. An auxiliary memory device 3 is directly connected to the ATM exchange 1. The ATM exchange 1 is connected to a network 2, which comprises another ATM exchange and communication cables, via another transmission path 7 having a capacity equivalent to 156 Mbps. Multiple terminals 6 (6d, 6e and 6f) are likewise connected to that another ATM exchange which constitutes the network 2.

The ATM-CLAD unit 4 assembles an ATM cell received from the ATM exchange 1 to reproduce user data (packet) and send the user data to the router unit 5, or disassembles user data (packet) received from the router unit 5 to assemble a cell and sends the cell to the ATM exchange 1.

The router unit 5 sends user data (packet) received from the ATM-CLAD unit 4 to any one of the terminals 6a–6c in accordance with destination information affixed to the user data, and sends user data (packet) received from any one of the terminals 6a–6c to the ATM-CLAD unit 4.

Each terminal 6 (6a to 6f) is a digital telephone or a computer or the like which is equipped with any or all of a display device, a digital camera, a microphone, a loud-speaker and a recording device. In the example in FIG. 1, the first terminal 6a and the third terminal 6c are computers equipped with display devices, while the second terminal 6b is a digital telephone.

Terminal numbers are affixed to the individual terminals. Each terminal 6 has a function for making a call connection request and a call, a function to receive a call and a function to request data transfer (connection change). Any terminal 6 which is making a call connection request is called "connection requesting terminal." Any terminal which is the destination of a connection request is called "connection requested terminal." Any terminal 6, which is previously designated as a substitute destination when another terminal 6 is busy, is called "substitute terminal." The connection requesting terminal which has established the call connection is called "calling terminal." The connection requested terminal or substitute terminal to which the call connection is established is called "receiving terminal." Any terminal 6 which is making a connection change request is called "connection-change requesting terminal." Any terminal 6 which is the destination of a connection change request is called "connection-change requested terminal." The following description will be given on the premise that any of the terminals 6d–6f is a connection requesting terminal and any of the terminals 6a–6c is a connection requested terminal or a substitute terminal.

The bandwidth necessary for communication of each terminal 6 varies depending on the type and quality of data which each terminal 6 sends or receives. For example, the bandwidth for audio data is about 30 Mbps, and it is about 60 Mbps for a low-density image and is about 80 Mbps for a high-density image. The ATM exchange 1 always monitors which terminal 6 needs what bandwidth and which terminal 6 is actually using what bandwidth. The ATM exchange 1 connects a connection requesting terminal to a connection requested terminal no only and only when the bandwidth designated by the connection requesting terminal can be secured on the transmission path 7 but when the connection requested terminal is not using that bandwidth. An informing bandwidth for exchanging information about a connection/disconnection service or the like with the ATM exchange 1 may be secured to be separate from the ordinary communication path in each terminal 6 (6a–6c). The ATM exchange 1 can send information to the terminal 6 (6a–6c) in which such an informing bandwidth is secured, regardless of whether that terminal 6 (6a–6c) is communicating.

The auxiliary memory device 3 serves as a terminal itself and stores various kinds of communication information. This auxiliary memory device 3 includes a storage medium such as a magnetic disk storage device, RAM, semiconductor storage device, magnetic tape device, MO (Magneto-Optical) disk device or IC card.

The ATM exchange 1 comprises a plurality of line control sections 14 (14a and 14b) connected to the transmission path 7, a switch section 13 which mutually couples the line control sections 14 (14a and 14b), a control apparatus 12 which control this switch section 13, and a storage device 11 connected to the control apparatus 12.

Each line control section 14 (14a, 14b) has a plurality of ports 141 to each of which the output transmission path 7 and the input transmission path 7 are connected. Each line control section 14 affixes routing information to an ATM cell externally received based on VPI (Virtual Path Identifier)/VCI (Virtual Channel Identifier) affixed to this ATM cell and sends the resultant ATM cell to the switch section 13 under the control of the control apparatus 12. Further, each line control section 14 rewrites the VPI/VCI of an ATM cell received from the switch section 13 based on routing information affixed to the ATM cell and sends the resultant ATM cell outside from one of the ports. The line control section 14a connected to the transmission path 7 which is linked to the network 2 is called "first line control section," and the line control section 14b connected to the transmission path 7 which is linked to the ATM-CLAD unit 4 is called "second line control section." The auxiliary memory device 3 is connected to the second line control section 14b.

The switch section 13 comprises several switches (demultipulexer, selector, multipulexer) and several transmission lines which are mutually linked in a network with these several switches. The switch section 13 sends the ATM cell received from any line control section 14 to any other line control section 14 based on the routing information affixed to the ATM cell under the control of the control apparatus 12. The switch section 13 transfers an ATM cell retaining data for a call connection control between the control apparatus 12 and the connection requesting terminal, the connection requested terminal or the substitute terminal. As the control apparatus 12 sets routing information in each line control section 14, therefore, the calling terminal is connected to the receiving terminal. This connection allows transmission of information and signals between the calling terminal and receiving terminal.

The storage device 11 stores a program 24 which is executed by the control apparatus 12 to control the individual components of the ATM exchange 1, and retains a call control table 15, a band management table 16, a first substitute terminal registration table 17 and a transfer type registration table 18.

The call control table 15 is used to manage the connection between a calling terminal and a receiving terminal condition for each call established by the control apparatus 12. FIG. 2 shows the data structure of the call control table 15. Written in the call control table 15 as one unit for each call set in the ATM exchange 1 are the terminal number of the calling terminal (calling terminal number), the bandwidth for the calling terminal uses (used bandwidth), the terminal number of the receiving terminal (receiving terminal number), the bandwidth the receiving terminal uses (used bandwidth), the port number to be coupled to the calling terminal (calling port number), VPI (calling VPI) and VCI (calling VCI) affixed to an ATM cell from the calling terminal, the port number to be coupled to the receiving terminal (receiving port number), VPI (receiving VPI) and VCI (receiving VCI) affixed to an ATM cell to be sent to the receiving terminal, the terminal number of the connection-change requesting terminal when the receiving terminal is the connection-change requesting terminal (transfer terminal number), the time at which a call is established (receiving time), the terminal number of the substitute terminal (substitute terminal number), and the terminal number of a simultaneous communication destination (simultaneous communication destination terminal number). The data written in the call control table 15 are retrieved for each unit with a call number associated with each unit as an index. The "call number" is the number set for each call.

The band management table 16 is for monitoring that the total of the bandwidths of all the calls so set as to go through the respective ports does not exceed the capacity of the ports. FIG. 3 shows the data structure of the band management table 16. As shown in FIG. 3, data associated with a call that comes through each port 141 is written as one unit information in the band management table 16. This one unit data consists of the VPI and VCI affixed to an ATM cell belonging to that call, and the bandwidth (used bandwidth) which the call is using. The informing bandwidth which is previously secured with respect to any of the terminals 6 is also written as one unit data in the band management table 16. With regard to a call for sending an ATM cell to the auxiliary memory device 3, the VPI and VCI and the used bandwidth are written as one unit data in the band management table 16. Likewise, the informing bandwidth which is previously secured with respect to the auxiliary memory device 3 is also written as one unit data in the band management table 16. Data associated with each call set in the band management table 16 is retrieved for each port with the port number used as an index.

Figure 4:
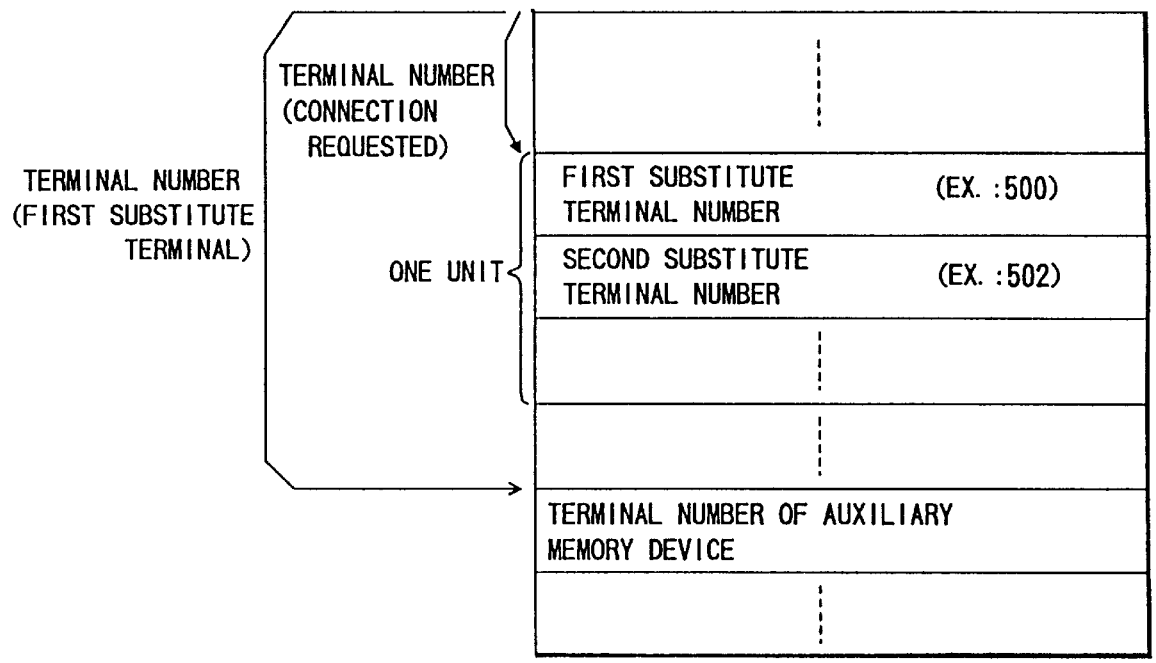
FIG. 4 is a structural diagram of a substitute terminal registration table (1) shown in FIG. 1.

Registered in the first substitute terminal registration table 17 is information about a substitute terminal which is previously designated as a transfer destination for each terminal 6 when that terminal 6 is busy. FIG. 4 shows the data structure of the first substitute terminal registration table 17. As shown in FIG. 4, for each terminal, the terminal numbers of a plurality of substitute terminals arranged in the priority order are written as one unit information in the first substitute terminal registration table 17. The number of the substitute terminal having the highest priority is called "first substitute terminal number," and the number of the substitute terminal having the second highest priority is called "second substitute terminal number." The data set in the first substitute terminal registration table 17 are retrieved for each unit by using the terminal number of the terminal associated with that unit as an index. FIG. 4 shows the first substitute terminal number and second substitute terminal number associated with one connection requested terminal and the terminal number of the auxiliary memory device which serves as a substitute terminal with respect to the first substitute terminal number.

Figure 5:
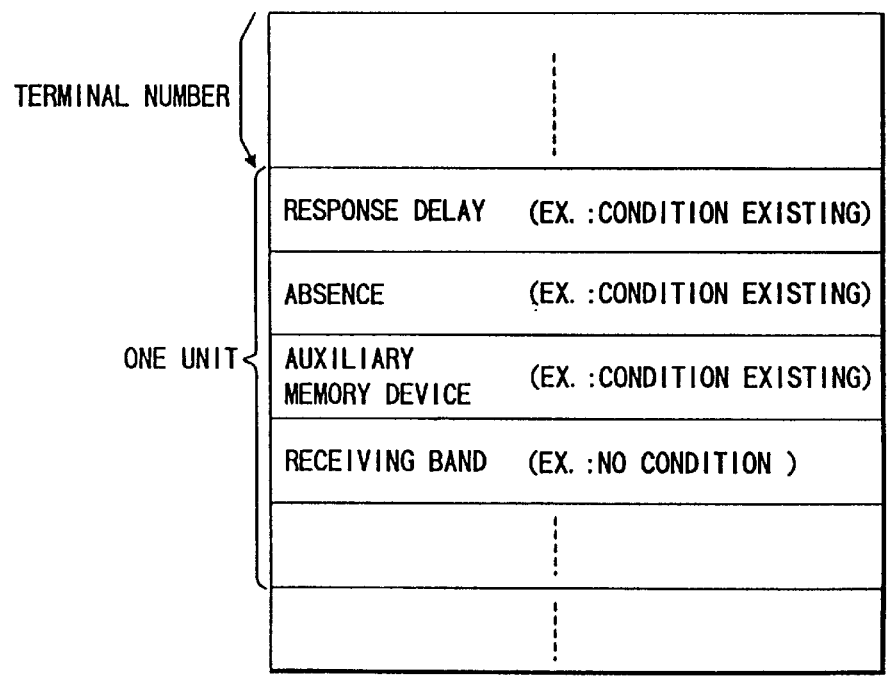
FIG. 5 is a structural diagram of a transfer type table shown in FIG. 1.

Data about the transfer types are registered in the transfer type registration table 18. FIG. 5 shows the data structure of the transfer type registration table 18. As shown in FIG. 5, for each terminal, information about transfer conditions for transferring a call designating that terminal as the connection requested terminal to a substitute terminal is set as one unit in the transfer type registration table 18. The information about the transfer conditions includes whether a response delay is set as a transfer condition, whether an absence is set as a transfer condition, whether the presence/absence of the auxiliary memory device is set as a transfer condition and whether an insufficient receiving band is set as a transfer condition. The data set in the transfer type registration table 18 are retrieved for each unit by using the terminal number as an index.

The storage device 11 comprises a magnetic disk storage device, RAM (Random Access Memory), semiconductor storage device, magnetic tape device, MO (Magnetic Optical) disk device or IC (Integrated Circuit) card.

The control apparatus 12 is a central processing unit (CPU) which performs the general control of the ATM exchange 1. The details of the process the control apparatus 12 executes based on the program 14 in the storage device 11 will be discussed below with reference to flowcharts in FIGS. 6 through 8.

Connection Process

Figure 6:
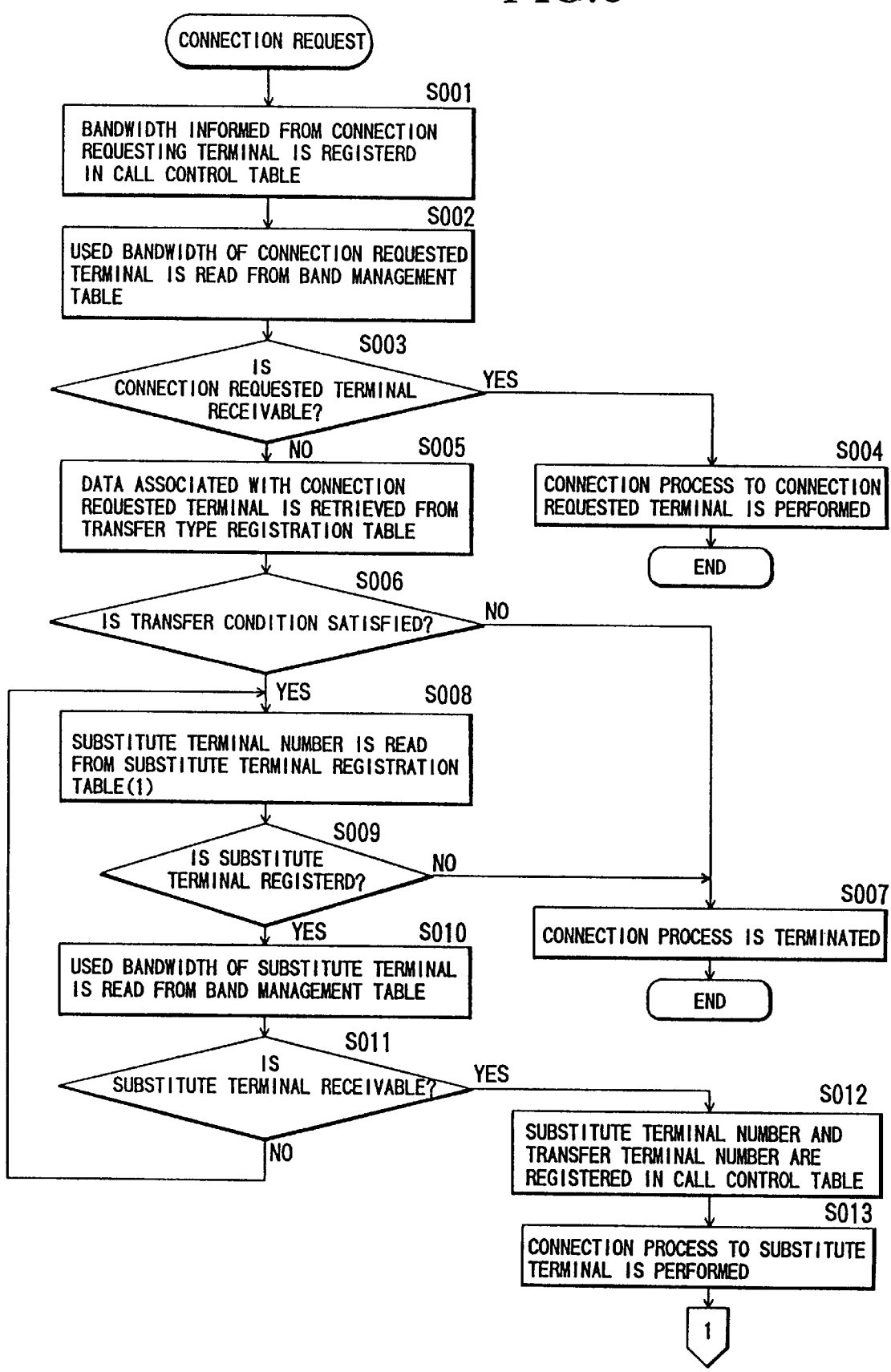
FIG. 6 is a flowchart illustrating connection process which are executed when a control apparatus shown in FIG. 1 receives a connection request from a terminal.

The connection process in FIG. 6 starts when any terminal, that is, connection requesting terminal makes a connection request (upon reception of an ATM cell retaining the terminal number and the used bandwidth of the connection requested terminal, and a call setting message, from the connection requesting terminal). In the first step S001 after the process starts, the control apparatus 12 registers the bandwidth requested by the connection requesting terminal in the call control table 15. In the next step S002, the control apparatus 12 reads the used bandwidth of the connection requested terminal from the band management table 16. In the next step S003, the control apparatus 12 determines if the connection requested terminal can receive based on the used bandwidth read in step S002. Specifically, the control apparatus 12 determines that reception is possible when the used bandwidth is equal to or smaller than a predetermined value, and determines that reception is not possible when the used bandwidth is greater than the predetermined value. When reception is possible, the control apparatus 12 performs a connection process to the connection requested terminal in step S004. Specifically, the control apparatus 12 describes information about the connection requested terminal in the column for entry of information about the receiving terminal in the call control table 15 and sets the individual line control sections 14 in such a manner that an ATM cell from the connection requesting terminal is transferred to the connection requested terminal.

When reception is not possible, on the other hand, the control apparatus 12 reads data associated with the connection requested terminal from the transfer type registration table 18 based on the terminal number of the connection requested terminal in step S005. In the next step S006, the control apparatus 12 checks if insufficient band is set as a transfer condition in the data read in step S005. When band insufficiency is not set as a transfer condition, the control apparatus 12 terminates the connection process in step S007.

When band insufficiency is set as a transfer condition, on the other hand, the control apparatus 12 executes a loop process from steps S008 to S011. In the first step S008 in this loop process, the control apparatus 12 reads one number of a substitute terminal associated with the connection requested terminal in the order of priority (the first substitute terminal number when it is the first time the loop process is executed, or the substitute terminal number equal to the executed times of the loop process when the loop process is executed more than once). Next, the control apparatus 12 checks in step S009 if reading of the substitute terminal number in step S008 is successful, i.e., if the substitute terminal number equal to the executed times of the loop process is registered in the first substitute terminal registration table 17. When the substitute terminal number equal to the executed times of the loop process is not registered in the first substitute terminal registration table 17, the control apparatus 12 terminates the connection process. When the substitute terminal number equal to the executed times the loop process is registered in the first substitute terminal registration table 17, however, the control apparatus 12 reads the used bandwidth of the substitute terminal whose terminal number has been read in step S008 from the band management table 16 in step S010. Then, the control apparatus 12 determines in step S011 if the substitute terminal whose terminal number has been read out in step S008 is ready for reception. Specifically, the control apparatus 12 determines that reception is possible when the used bandwidth of the substitute terminal read in step S010 is equal to or smaller than a predetermined value and when the difference between the total value of the used bandwidths associated with the port 141 connected to that substitute terminal and the capacity of that port is equal to or greater than the informed used band, and determines that reception is not possible otherwise. When reception is not possible, the control apparatus 12 returns to step S008 and reads the substitute terminal number with the next highest priority.

When a receivable substitute terminal is found by repeatedly executing this loop process, the control apparatus 12 registers the terminal number of that substitute terminal as "substitute terminal number" in the call control table 15 and registers the terminal number of the connection requested terminal as "transfer terminal number" in step S012. In the subsequent step S013, the control apparatus 12 executes a connection process for that substitute terminal. Specifically, the control apparatus 12 describes information about the substitute terminal in the column for entry of information about the receiving terminal in the call control table 15 and sets the individual line control sections 14 in such a manner that an ATM cell from the connection requesting terminal is transferred to the substitute terminal.

In the next step S014, the control apparatus 12 reads the transfer terminal number (connection requested terminal number), the substitute terminal number and information about the receiving time from the call control table 15. In the subsequent step S015, the control apparatus 12 reads the informing bandwidth of the connection requested terminal from the band management table 16 based on the transfer terminal number read in step S014. In the next step S016, the control apparatus 12 checks if the informing band is usable based on the informing bandwidth read in step S015. When the informing band is usable, i.e., when the informing band is secured for the connection requested terminal and is not being used, the control apparatus 12 transfers the transfer terminal number (connection requested terminal number), the substitute terminal number and information about the receiving time read in step S014 to the connection requested terminal by using the informing band, and proceeds to step S021. When the informing band is not usable, i.e., when the informing band is not secured for the connection requested terminal or it is being used, in step S018, the control apparatus 12 reads the terminal number (auxiliary memory device terminal number) of the auxiliary memory device 3, which is set as a substitute terminal associated with this substitute terminal number, from the first substitute terminal registration table 17 based on the substitute terminal number read in step S014. In the next step S019, the control apparatus 12 reads the informing bandwidth of the auxiliary memory device 3 from the band management table 16 based on the auxiliary memory device terminal number read in step S018. In the next step S020, the control apparatus 12 stores the transfer terminal number (connection requested terminal number), the substitute terminal number and information about the receiving time read in step S014 into the auxiliary memory device 3 using the informing band, and proceeds to step S021.

In step S021, the control apparatus 12 checks if the substitute terminal is designating the auxiliary memory device 3 as a simultaneous communication destination. Specifically, this check is made on the basis of whether an ATM cell retaining information indicating such a designation is received from the substitute terminal. When the substitute terminal is not designating the auxiliary memory device 3 as a simultaneous communication destination, the control apparatus 12 checks in step S030 if the process in step S020 has been executed. The control apparatus 12 proceeds to step S026 when the process in step S020 has been executed, or terminates this connection process when the process in step S020 has not been executed. When the substitute terminal is designating the auxiliary memory device 3 as a simultaneous communication destination, on the other hand, the control apparatus 12 reads the auxiliary memory device terminal number corresponding to the substitute terminal number read in step S014 from the first substitute terminal registration table 17 in step S022 based on that read substitute terminal number. In the next step S023, the control apparatus 12 reads the used bandwidth of the auxiliary memory device 3 from the band management table 16 based on the auxiliary memory device terminal number read in step S022. In the next step S024, the control apparatus 12 sets the terminal number of the auxiliary memory device 3 as the simultaneous communication destination in the call control table 15. In the subsequent step S025, the control apparatus 12 instructs the switch section 13 to establish an additional connection so that simultaneous communication to the auxiliary memory device 3 is performed. Consequently, the ATM cell sent from the calling terminal, i.e., cell copying of communication information between the calling terminal and the receiving terminal (substitute terminal) is performed in the switch section 13 and this communication information is written in the auxiliary memory device 3. Thereafter, the control apparatus 12 proceeds to step S026.

In step S026, the control apparatus waits for the call between the calling terminal and the receiving terminal (substitute terminal) is disconnected. When the call is disconnected, the control apparatus 12 reads the used band of the connection requested terminal (transfer terminal) from the band management table 16 in step S027, and checks if the band of the connection requested terminal (transfer terminal) has an free area in the next step S028. When no free area is found in the used band, the control apparatus 12 returns to step S027. When an available area is found in the used band, however, the control apparatus 12 proceeds to step S029 where the control apparatus 12 transfers the information sent to the auxiliary memory device 3 in step S020 and the communication information stored in the auxiliary memory device 3 in step S025 to the connection requested terminal (transfer terminal). It is therefore unnecessary to send information to the connection requested terminal from the substitute terminal. When this information transfer is complete, the control apparatus 12 terminates this connection process.

Operation of Communication System

Figure 7:
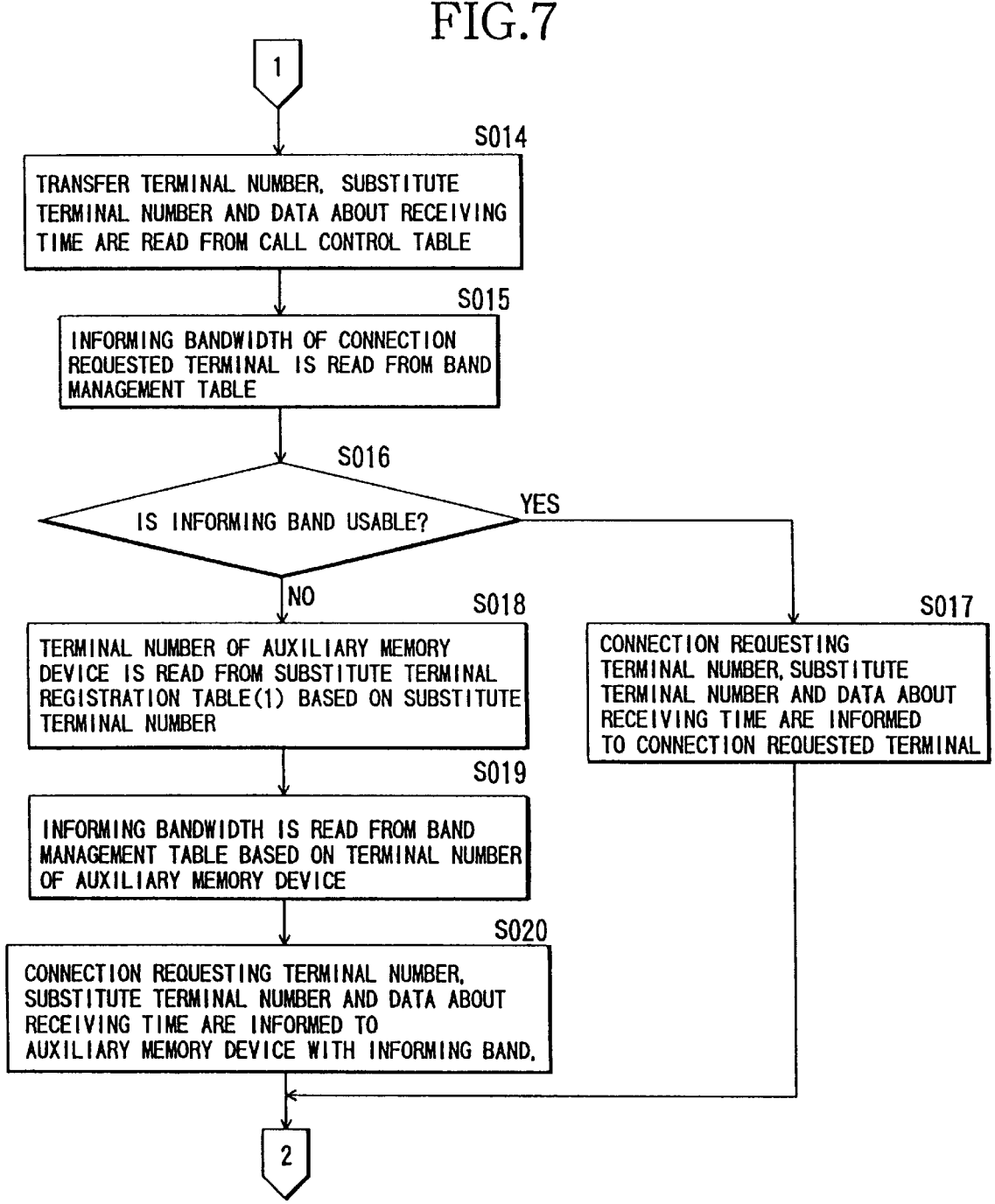
FIG. 7 is a flowchart illustrating connection process which are executed when the control apparatus shown in FIG. 1 receives a connection request from a terminal.
Figure 8:
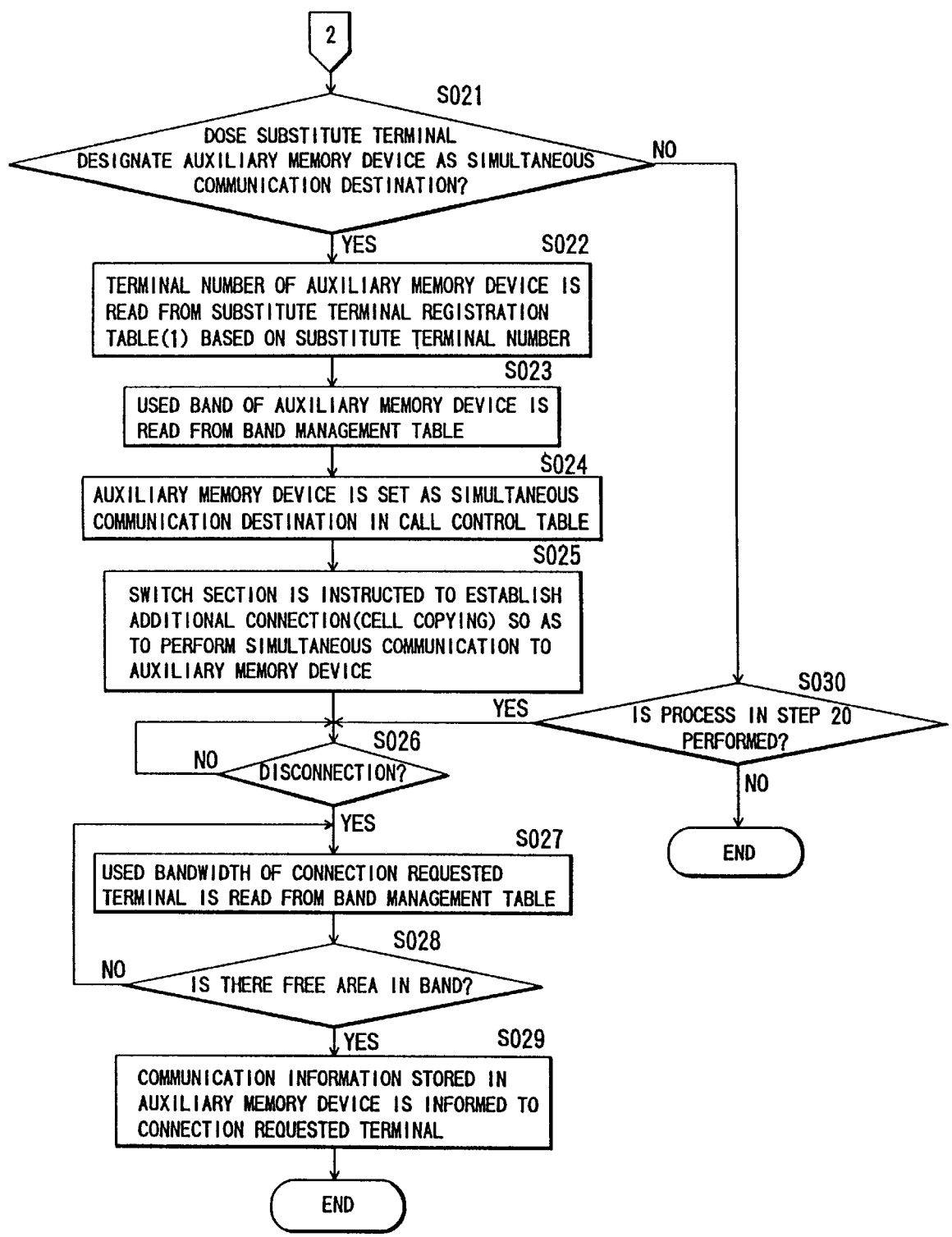
FIG. 8 is a flowchart illustrating connection process which are executed when the control apparatus shown in FIG. 1 receives a connection request from a terminal.
Figure 9:
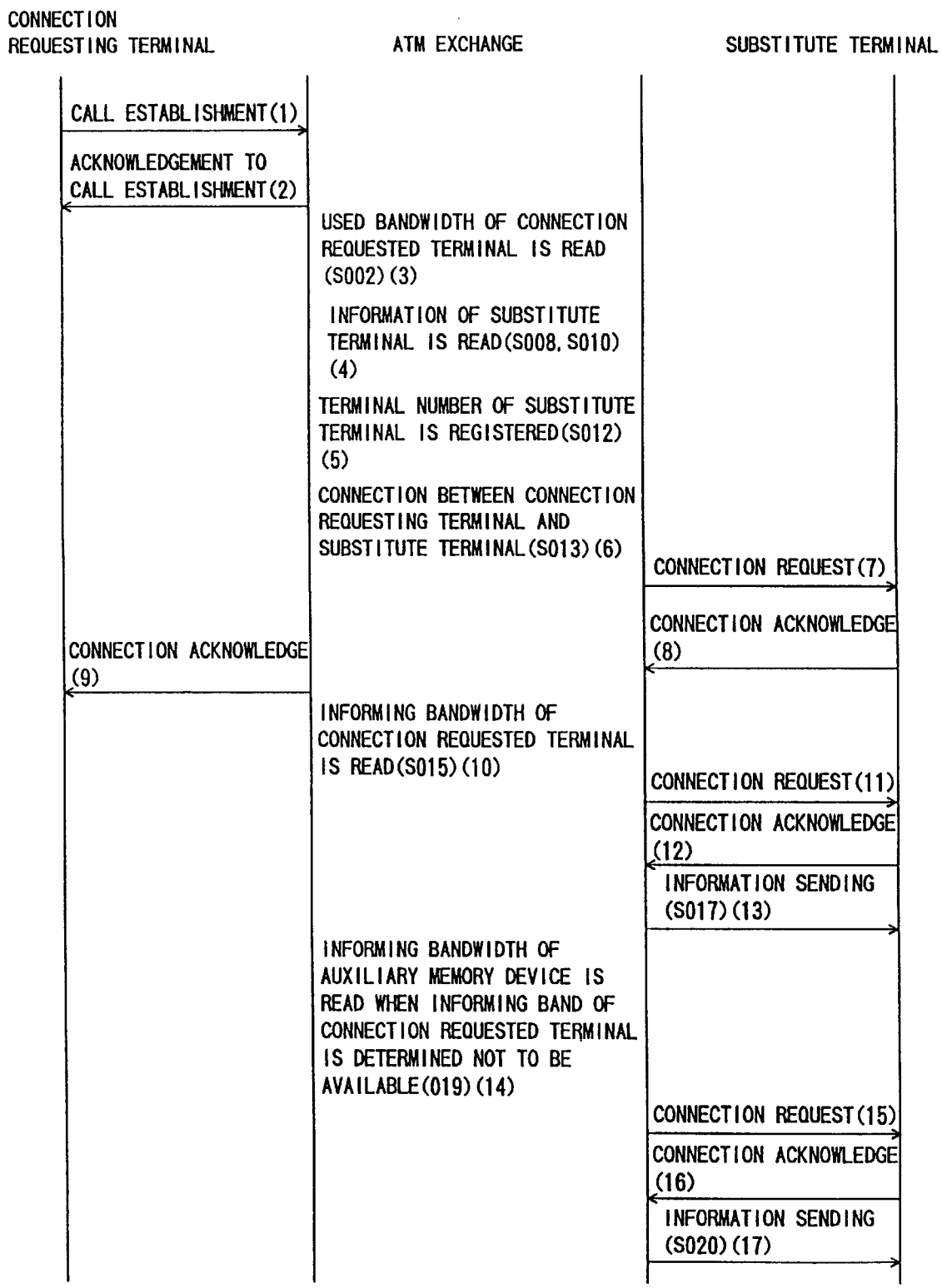
FIG. 9 is a sequence chart showing the operation inside the communication network shown in FIG. 1.
Figure 10:
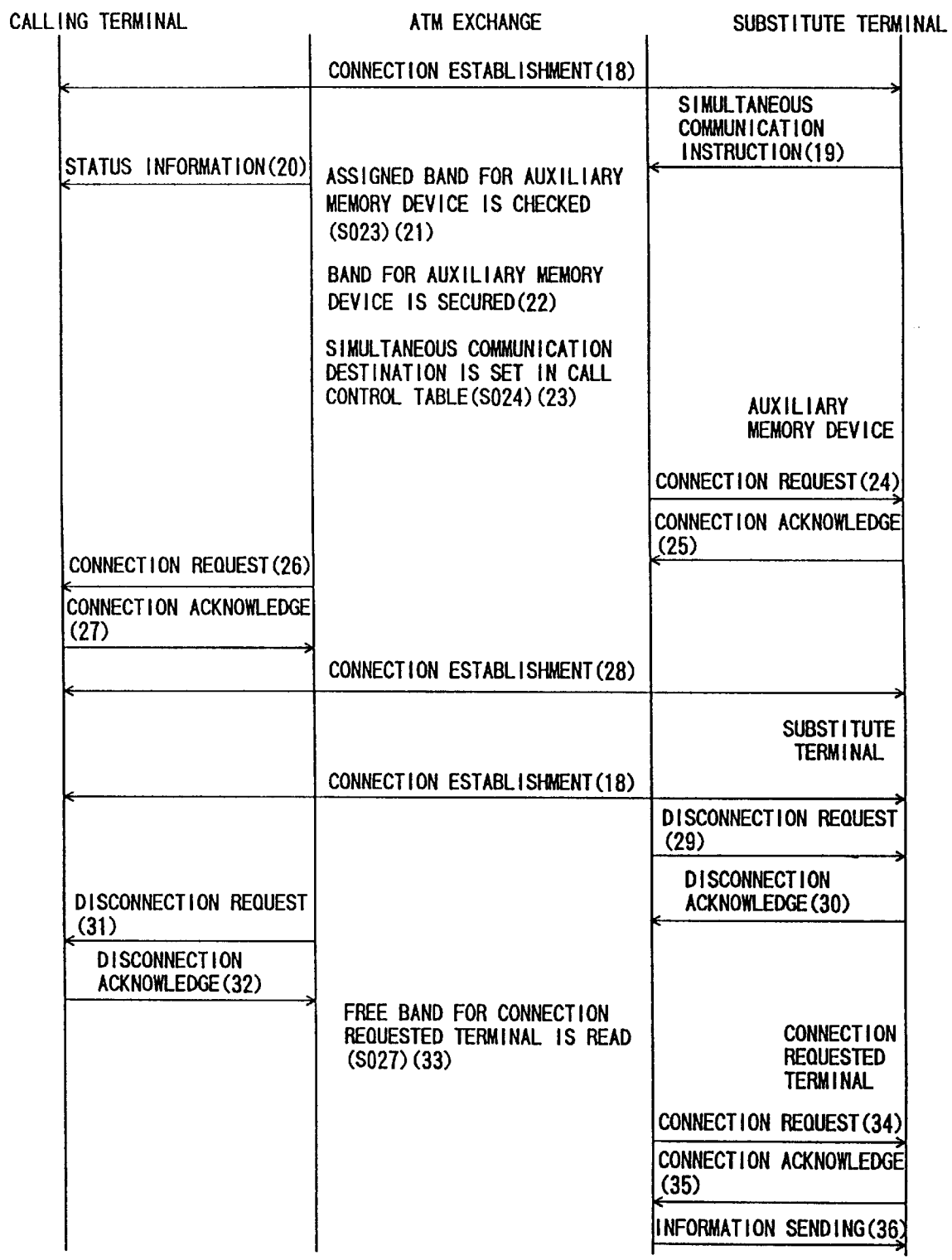
FIG. 10 is a sequence chart showing the operation inside the communication network shown in FIG. 1.

The general operation of the communication system according to the execution of the connection process by the control apparatus 12 will be discussed below with sequence charts in FIGS. 9 and 10. In FIGS. 9 and 10, step numbers used in the flowcharts in FIGS. 6–8 are also affixed for the explanation of the associated operations of the ATM exchange 1.

First, the connection requesting terminal sends a "call establishment" message indicative of the initiation of call establishment to the ATM exchange 1 ((1)). The ATM exchange sends an acknowledgement to the call establishment to the connection requesting terminal ((2)), and reads the used bandwidth of the connection requested terminal from the band management table 16 to check the status of the connection requested terminal (S002) ((3)). When connection to the connection requested terminal is not possible with the used bandwidth obtained in step S002, the ATM exchange 1 reads the terminal number of the substitute terminal and the used bandwidth thereof from the first substitute terminal registration table 17 to find a transfer destination (S008, S010) ((4)). When the ATM exchange 1 checks the used bandwidth of the substitute terminal read in step S010 and determines that the substitute terminal is connectable, the ATM exchange 1 registers the terminal number of the substitute terminal in the call control table 15 (S012) ((5)). Subsequently, the ATM exchange executes the connection of the connection requesting terminal to the substitute terminal (S013) ((6)). Then, the ATM exchange 1 sends a "connection request" message to the substitute terminal ((7)). In response to this message, the substitute terminal sends a "connection acknowledge" message indicating the reception of the "connection request" message to the ATM exchange 1 ((8)). In response to this message, the ATM exchange sends a "connection acknowledge" message to the connection requesting terminal ((9)).

Next, the ATM exchange 1 reads the informing bandwidth of the connection requested terminal from the band management table 16 (SO15) ((10)). When determining that the read informing bandwidth is usable, the ATM exchange 1 sends a "connection request" message to the connection requested terminal ((11)). In response to the message, the connection requested terminal returns a "connection acknowledge" message indicating the reception of the "connection request" message to the ATM exchange 1 ((12)). Accordingly, the ATM exchange 1 sends the calling terminal number (connection requesting terminal number), the connection requesting terminal number (transfer terminal number), the substitute terminal number and data about the receiving time to the connection requesting terminal with the informing bandwidth of the connection requested terminal (S017) ((13)).

When determining that the informing bandwidth read in step S015 is not available, the ATM exchange 1 selects the auxiliary memory device 3 as the substitute terminal and reads the informing bandwidth of this auxiliary memory device 3 from the band management table 16 (S019) ((14)). Then, the ATM exchange 1 sends a "connection request" message to the auxiliary memory device 3 ((15)). In response to this message, the auxiliary memory device 3 returns a "connection acknowledge" message indicating the reception of the "connection request" message to the ATM exchange 1 ((16)). In response to this message, the ATM exchange 1 sends the calling terminal number (connection requesting terminal number), the connection requesting terminal number (transfer terminal number), the substitute terminal number and data about the receiving time to the connection requesting terminal with the informing bandwidth of the auxiliary memory device 3 (S020) ((17)).

Suppose that, through the above processing, the substitute terminal designates the auxiliary memory device as a simultaneous communication destination to the ATM exchange 1 ((19)) while the connection requesting terminal (calling terminal) is being connected to the substitute terminal (receiving terminal) ((18)). In this case, the ATM exchange 1 sends the calling terminal a "status informing" message indicating that simultaneous communication is to be initiated ((20)). Then, the ATM exchange 1 checks the assigned band of the auxiliary memory device 3 (S023) ((21)) and secures the bandwidth of the auxiliary memory device 3 ((22)). Subsequently, the ATM exchange 1 sets the auxiliary memory device 3 as the simultaneous communication destination in the call control table 15 ((23)). Then, the ATM exchange 1 sends a "connection request" message to the auxiliary memory device 3 ((24)). Upon reception of this connection request, the auxiliary memory device 3 sends a "connection acknowledge" message to the ATM exchange 1 ((25)). Accordingly, the ATM exchange 1 sends a "connection request" message to the calling terminal (connection requesting terminal) ((26)). Upon reception of this the calling terminal (connection requesting terminal) returns a "connection acknowledge" message to the ATM exchange ((27)). Through this process, an additional connection between the calling terminal (connection requesting terminal) and the auxiliary memory device 3 is established ((28)). Therefore, the calling terminal (connection requesting terminal) becomes ready to make simultaneous communication to the substitute terminal and the auxiliary memory device 3.

Suppose that the ATM exchange 1 has sent a "disconnection request" message to the substitute terminal during this simultaneous communication ((29)). In this case, the substitute terminal having received this disconnection request returns a "disconnection acknowledge" message to the ATM exchange 1 ((30)). At this time, the ATM exchange 1 also sends a "disconnection request" message to the calling terminal (connection requesting terminal) ((31)). Upon reception of this disconnection request, the calling terminal (connection requesting terminal) returns a "disconnection acknowledge" message to the ATM exchange ((32)). Thereafter, the ATM exchange 1 monitors a free band for the connection requested terminal (transfer terminal) (S027) ((33)). When an available area is found in the band in the monitoring process in step S027, the ATM exchange 1 sends a "connection request" message to the connection requested terminal (transfer terminal) ((34)). Upon reception of the connection request, the connection requested terminal (transfer terminal) returns a "connection acknowledge" message to the ATM exchange 1 ((35)). Then, the ATM exchange 1 informs the connection requested terminal (transfer terminal) of the communication information stored in the auxiliary memory device 3 ((36)).

According to the first embodiment, as discussed above, if a substitute terminal is registered in the first substitute terminal registration table 17, the substitute terminal can be connected even if the connection requested terminal is not connectable. In this case, if the communication band is secured for the connection requested terminal and is usable, the connection requested terminal is informed of the connection being made to the substitute terminal. Even if the connection band is not secured or it is not usable, the auxiliary memory device 3 is informed of the establishment of the connection to the substitute terminal and the connection requested terminal will be informed of such an event later. In any case, the connection requested terminal can know the establishment of the connection to the substitute terminal, so that the connection requested terminal can ask the connection requesting terminal or the substitute terminal about the communication contents. When the substitute terminal instructs simultaneous communication to the ATM exchange 1, the contents of communication between the connection requesting terminal and the substitute terminal are stored in the auxiliary memory device 3 and the connection requesting terminal are informed of the communication contents after the communication is disconnected. In this case, the connection requested terminal need not ask the connection requesting terminal or the substitute terminal about the communication contents.

Second Embodiment
Structure of Communication System

Figure 11:
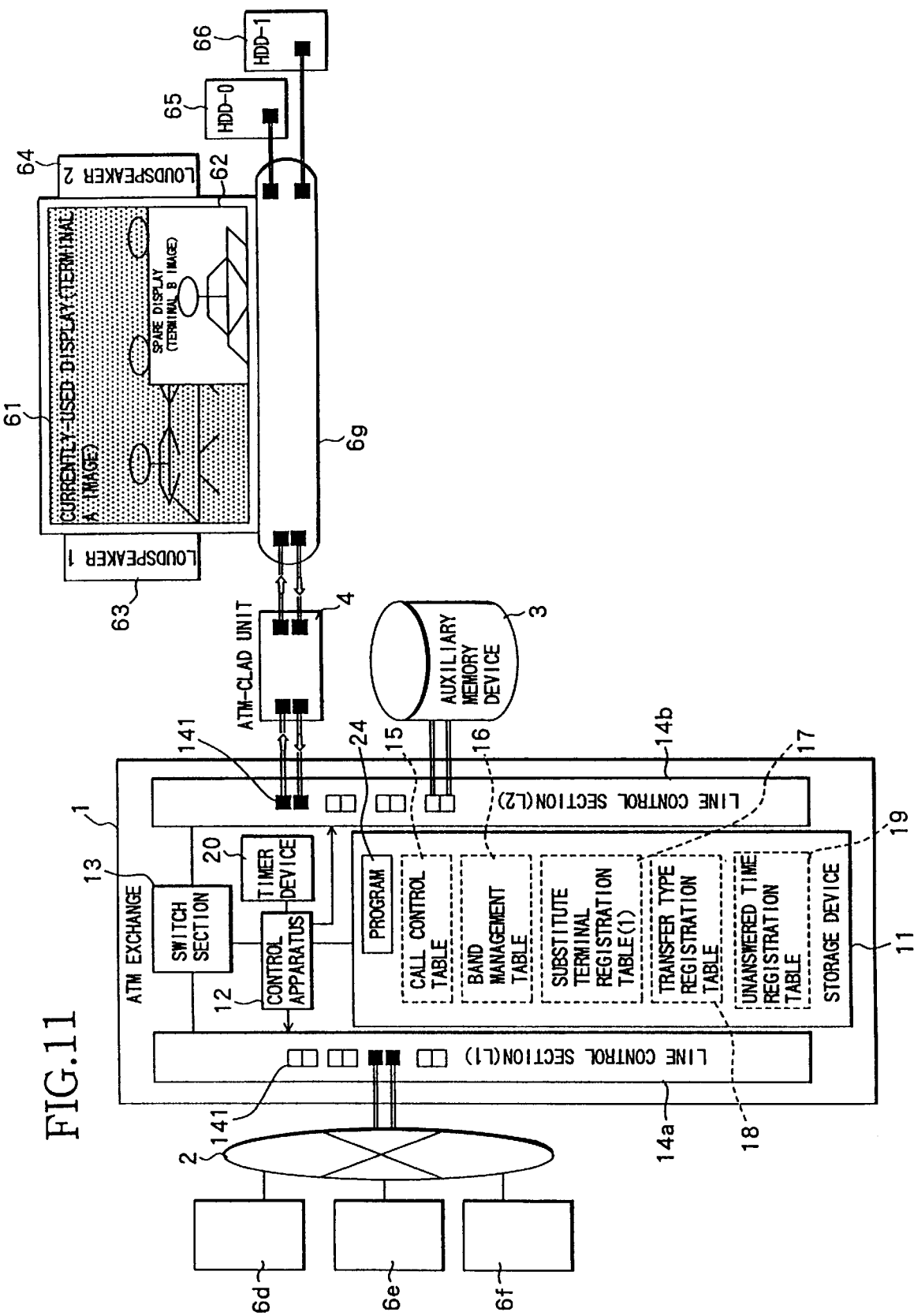
FIG. 11 is a block diagram showing the structure of a communication network in which an ATM exchange according to the second embodiment of this invention is used.

FIG. 11 presents a block diagram illustrating the structure of a communication network in which an ATM exchange 1 according to the second embodiment of this invention is used. Like or same reference numerals are given to those components in FIG. 11 which are the same as the corresponding components of the first embodiment.

The ATM exchange 1 according to the second embodiment differs from that of the first embodiment in that a timer device 20 is connected to the control apparatus 12, an unanswered time registration table 19 is stored in the storage device 11, and a TV (Television) conference terminal 6g is connected to the second control section 14b via the ATM-CLAD unit 4.

The TV conference terminal 6g is a computer which is equipped with display devices 61 and 62, loudspeakers 63 and 64 and storage media 65 and 66, i.e., a multimedia terminal. The TV conference terminal 6g is connected to the ATM-CLAD unit 4 via the fast serial interface 8 and can have a predetermined terminal functions. Specifically, those terminal functions include a terminal function for make a call to send image data (high-density image data) to be displayed on the currently-used display 61 (hereinafter this terminal function is called "currently-used display terminal"), a terminal function for receiving a call to receive image data (low-density) to be displayed on the spare display 62 (hereinafter this terminal function is called "spare display terminal"), a terminal function for receiving a call to receive speech data output from the currently-used loudspeaker 63 (hereinafter this terminal function is called "currently-used speaker terminal"), a terminal function for receiving a call to receive speech data output from the spare loudspeaker 64 (hereinafter this terminal function is called "spare speaker terminal"), a terminal function for receiving a call to receive a data file to be stored in the currently-used storage medium 65 (hereinafter this terminal function is called "currently-used storage medium terminal"), and a terminal function for receiving a call to receive a data file to be stored in the spare storage medium 66 (hereinafter this terminal function is called "spare storage medium terminal"). Those terminal functions have specific terminal numbers registered in the ATM exchange so that they can behave like independent terminals with respect to the ATM exchange 1. The TV conference terminal 6g is recognized by the ATM exchange 1 as one which, like the router unit 5 in the first embodiment, distributes user data (packet) sent from the ATM-CLAD unit 4 to the individual terminal functions according to the destination. Although the currently-used display 61 and the spare display 62 are windows displayed on the same display device, they may be designed as separate display devices.

The timer device 20 is a timer which gives time information to the control apparatus 12.

Figure 12:
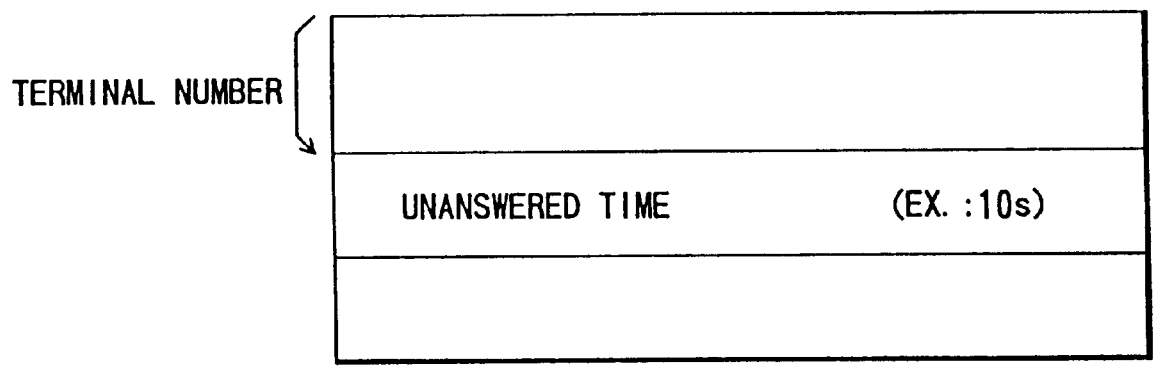
FIG. 12 is a structural diagram of an unanswered time registration table shown in FIG. 11.

Registered in the unanswered time registration table 19 is a reference time for determining if that terminal have made a response as an "unanswered time" for each terminal. FIG. 12 shows the data structure of the unanswered time registration table 19. As shown in FIG. 12, each registered unanswered time is retrieved with the terminal numbers as an index.

Set in the first substitute terminal registration table 17 are spare terminals (spare display terminal, spare speaker terminal and spare storage medium terminal) as substitute terminals associated with the respective currently-used terminals (currently-used display terminal, currently-used speaker terminal and currently-used storage medium terminal).

Because the other structure of the second embodiment is the same as that of the first embodiment, its description will not be repeated.

The details of the process the control apparatus 12 executes based on the program 24 in the storage device 11 will be discussed below with reference to flowcharts in FIGS. 13 through 18.

Connection Process

Figure 13:
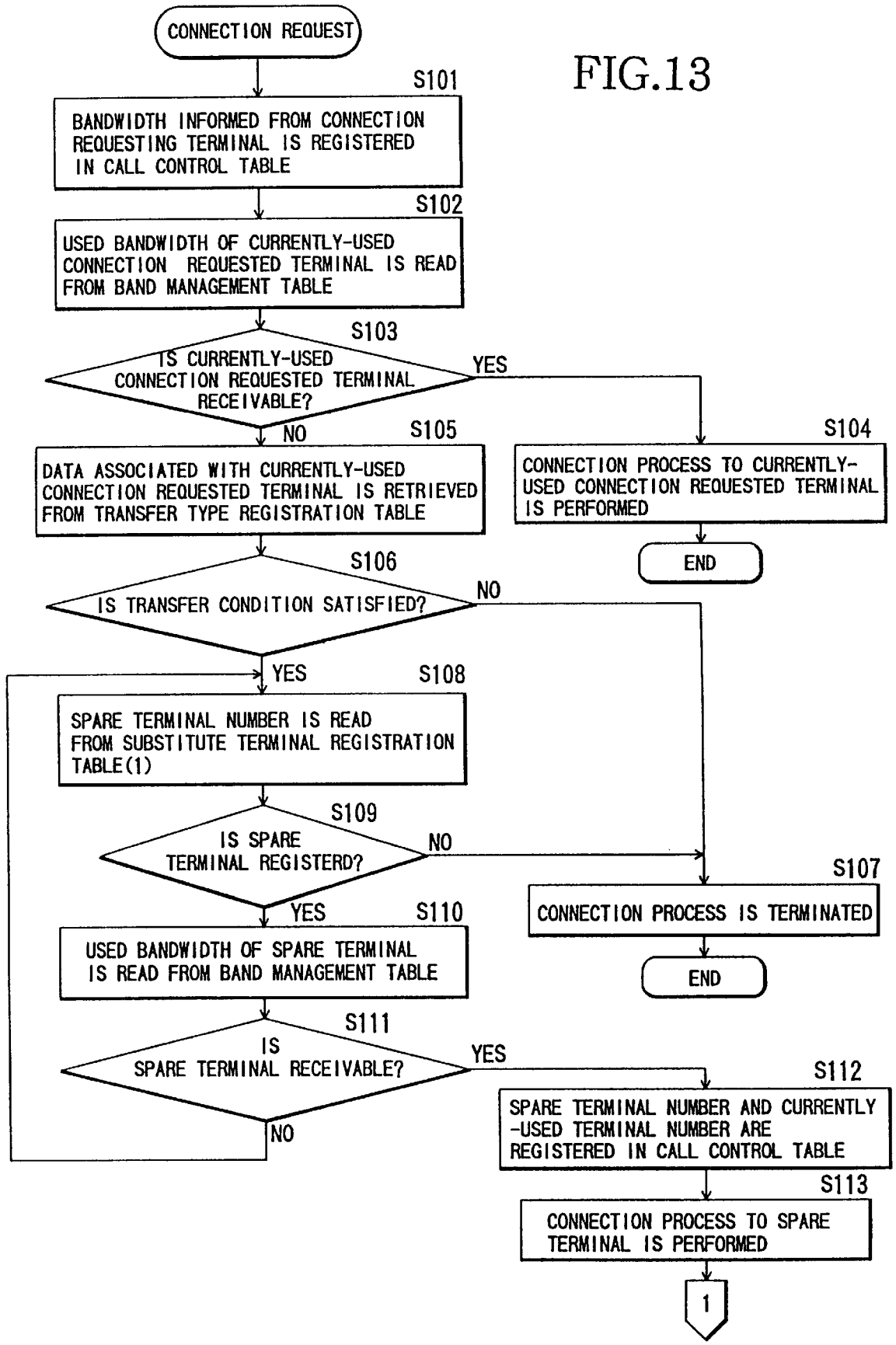
FIG. 13 is a flowchart illustrating connection process which are executed when a control apparatus shown in FIG. 11 receives a connection request from a terminal.

The connection process in FIG. 13 starts when any terminal or connection requesting terminal makes a connection request (upon reception of an ATM cell retaining the terminal number and the used bandwidth of the connection requested terminal, and a call establishing message, from the connection requesting terminal). The connection requested terminal in this case is one of the currently-used terminals (currently-used display terminal, currently-used speaker terminal and currently-used storage medium terminal). In the first step S101 after the process starts, the control apparatus 12 registers the bandwidth requested by the connection requesting terminal in the call control table 15. In the next step S102, the control apparatus 12 reads the used bandwidth of the currently-used connection requested terminal from the band management table 16. In the next step S103, the control apparatus 12 determines if the currently-used connection requested terminal can receive based on the used bandwidth read in step S102. Specifically, the control apparatus 12 determines that reception is possible when the used bandwidth is equal to or smaller than a predetermined value, and determines that reception is not possible when the used bandwidth is greater than the predetermined value. When reception is possible, the control apparatus 12 performs a connection process to the currently-used connection requested terminal in step S104. Specifically, the control apparatus 12 describes information about the connection requested terminal in the column for entry of information about the receiving terminal in the call control table 15 and sets the individual line control sections 14 in such a manner that an ATM cell from the connection requesting terminal is transferred to the connection requested terminal.

When reception is not possible, on the other hand, the control apparatus 12 reads data associated with the connection requested terminal from the transfer type registration table 18 based on the terminal number of the connection requested terminal in step S105. In the next step S106, the control apparatus 12 checks if band insufficiency is set as a transfer condition in the data read in step S105. When band insufficiency is not set as a transfer condition, the control apparatus 12 terminates the connection process in step S107.

When band insufficiency is set as a transfer condition, on the other hand, the control apparatus 12 reads the terminal number of the spare terminal corresponding to the currently-used connection requested terminal from first substitute terminal registration table 18. Next, the control apparatus 12 checks in step S109 if the terminal number of the spare terminal has been read out. When the terminal number of the spare terminal has not been read out, the control apparatus 12 terminates the connection process in step S107. When the terminal number of the spare terminal has been read out, on the other hand, the control apparatus 12 reads the used bandwidth of the spare terminal whose terminal number has been read in step S108 from the band management table 16 in step S110. Then, the control apparatus 12 determines in step S111 if the spare terminal whose terminal number has been read out in step S108 is ready for reception. Specifically, the control apparatus 12 determines that reception is possible when the used bandwidth of the spare terminal read in step S110 is equal to or smaller than a predetermined value and when the difference between the total value of the used bandwidths associated with the port 141 connected to that spare terminal and the capacity of that port is equal to or greater than the used band which is informed, and determines that reception is not possible otherwise. When reception is not possible, the control apparatus 12 returns to step S108 and repeats the processing from steps S108 to S111 until the spare terminal becomes receivable. When reception is possible, the control apparatus 12 registers the terminal number of the spare terminal as the "substitute terminal number" and the terminal number of the currently-used connection requested terminal as the "transfer terminal number" into the call control table 15. In the next step S113, the control apparatus 12 performs a connection process for that spare terminal. Specifically, the control apparatus 12 describes information about the spare terminal in the column for entry of information about the receiving terminal in the call control table 15 and sets the individual line control sections 14 in such a manner that an ATM cell from the connection requesting terminal is transferred to the spare terminal. Then, the control apparatus 12 executes the processing starting from step S014 illustrated in FIGS. 7 and 8.

Connection Process

Figure 14:
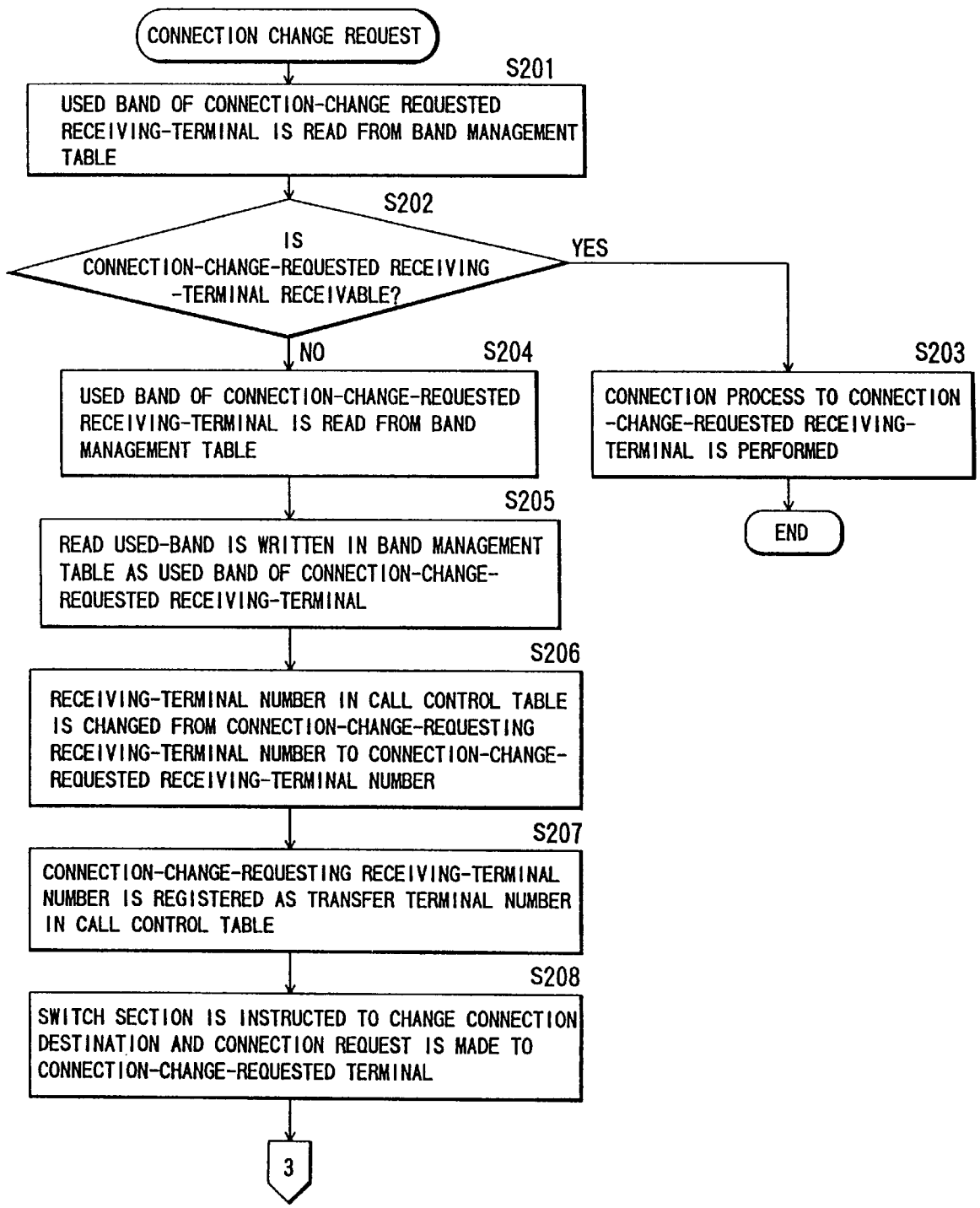
FIG. 14 is a flowchart illustrating connection change process which are executed when the control apparatus shown in FIG. 11 receives a connection change request from a terminal.

The connection process in FIG. 14 starts when a connection change request is made so as to change a connection destination from any receiving terminal which is connected (including a currently-used terminal and a spare terminal, hereinafter this terminal is called "connection-change requesting receiving terminal") to another terminal (hereinafter called "connection-change requested receiving terminal") (i.e., upo n reception of an ATM cell retaining the information of the connection-change requested terminal such as the terminal number and the used bandwidth necessary for the connection-change requested terminal, and a connection-change instructing message, from the connection-change requesting receiving terminal).

In the first step S201 after the process starts, the control apparatus 12 reads the used bandwidth of the connection-change requested receiving terminal from the band management table 16. In the next step S202, the control apparatus 12 determines if the connection-change requesting receiving terminal can receive based on the used bandwidth read in step S201. Specifically, the control apparatus 12 determines that reception is possible when the used bandwidth of the connection-change requested receiving terminal is equal to or smaller than a predetermined value and when the difference between the total value of the used bandwidths associated with the port 141 connected to that connection-change requested receiving terminal and the capacity of that port is equal to or greater than the used band which is informed, and determines that reception is not possible otherwise. When reception is possible, the control apparatus 12 performs a connection process to the connection-change requested receiving terminal in step S203. Specifically, the control apparatus 12 overwrites information about the connection-change requested receiving terminal in the column for entry of information about the receiving terminal in the call control table 15 and sets the individual line control sections 14 in such a manner that an ATM cell from the calling terminal is transferred to the connection-change requested receiving terminal.

When reception is not possible, on the other hand, the control apparatus 12 reads the used band of the connection-change requesting receiving terminal from the band management table 16 in step S204. In the next step S205, the control apparatus 12 erases the used band of the connection-change requesting receiving terminal from the band management table 16 and writes the used band read in step S204 as the used band of the connection-change requested receiving terminal into the band management table 16. When the used band read in step S204 is smaller than the informed used-bandwidth at this time, the used band read in step S204 is incremented within the range of the difference between the total value of the used bandwidths associated with the port 141 connected to that connection-change requested receiving terminal and the capacity of that port, and the resultant used band is written in the band management table 16. In the next step S206, the control apparatus 12 rewrites the contents of the column of the "receiving terminal number" in the call control table 15 to the terminal number of the connection-change-requested receiving terminal from the terminal number of the connection-change-requesting receiving terminal. In the next step S207, the control apparatus 12 registers the terminal number of the connection-change requesting receiving terminal in the column of the "transfer terminal number" in the call control table 15. In the subsequent step S208, the control apparatus 12 instructs the individual line control sections 14a and 14b and the switch section 13 to change the connection destination and makes a connection request to the connection-change requested receiving terminal.

In the next step S209, the control apparatus 12 checks if there is a response to the connection request made in step S028 from the connection-change requested receiving terminal. When there is such a response, the control apparatus 12 executes a connection process to the connection-change requested receiving terminal (step S203). Specifically, the control apparatus 12 overwrites information about the connection-change requested receiving terminal in the column for entry of information about the receiving terminal in the call control table 15 and sets the individual line control sections 14 in such a manner that an ATM cell from the calling terminal is transferred to the connection-change requested receiving terminal. When there is no such response, on the other hand, the control apparatus 12 acquires the time passed since the making of the connection request to the connection-change requested terminal in step S208, in step S211, and checks if the passed time has reached the unanswered time for that terminal which is registered in the unanswered time registration table 19 in step S212. When the passed time has not reached the unanswered time yet, the control apparatus 12 returns to step S209.

When the passed time has reached the unanswered time, however, the control apparatus 12 reads the terminal number of the transfer terminal, that is, the connection-change requesting receiving terminal from the call control table 15. In the next step S214, the control apparatus 12 returns the used bandwidth data in the band management table 16 to the an used bandwidth which has originally been set for the connection-change requesting receiving terminal. In the next step S215, the control apparatus 12 changes the contents of the column of the "receiving terminal number" in the call control table 15 from the terminal number of the connection-change-requested receiving terminal to the terminal number of the connection-change-requesting receiving terminal. In the next step S216, the control apparatus 12 registers the terminal number of the connection-change requested receiving terminal in the column of the "transfer terminal number" in the call control table 15. In the subsequent step S217, the control apparatus 12 instructs the individual line control sections 14a and 14b and the switch section 13 to change the connection destination and terminates this connection change process.

Operation of Communication System

Figure 15:
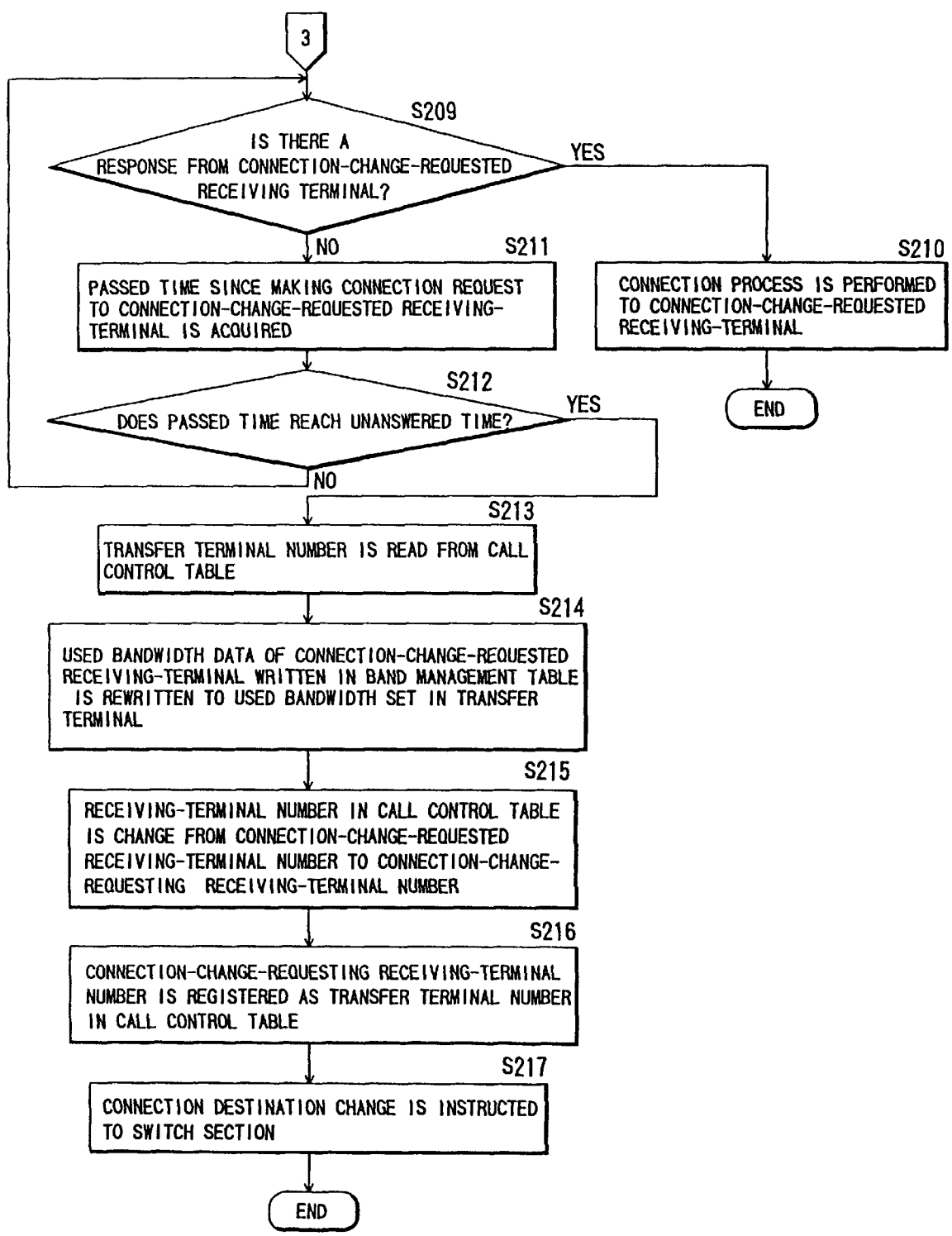
FIG. 15 is a flowchart illustrating connecting procedures which are executed when the control apparatus shown in FIG. 11 receives a connection change request from a connected terminal.
Figure 16:
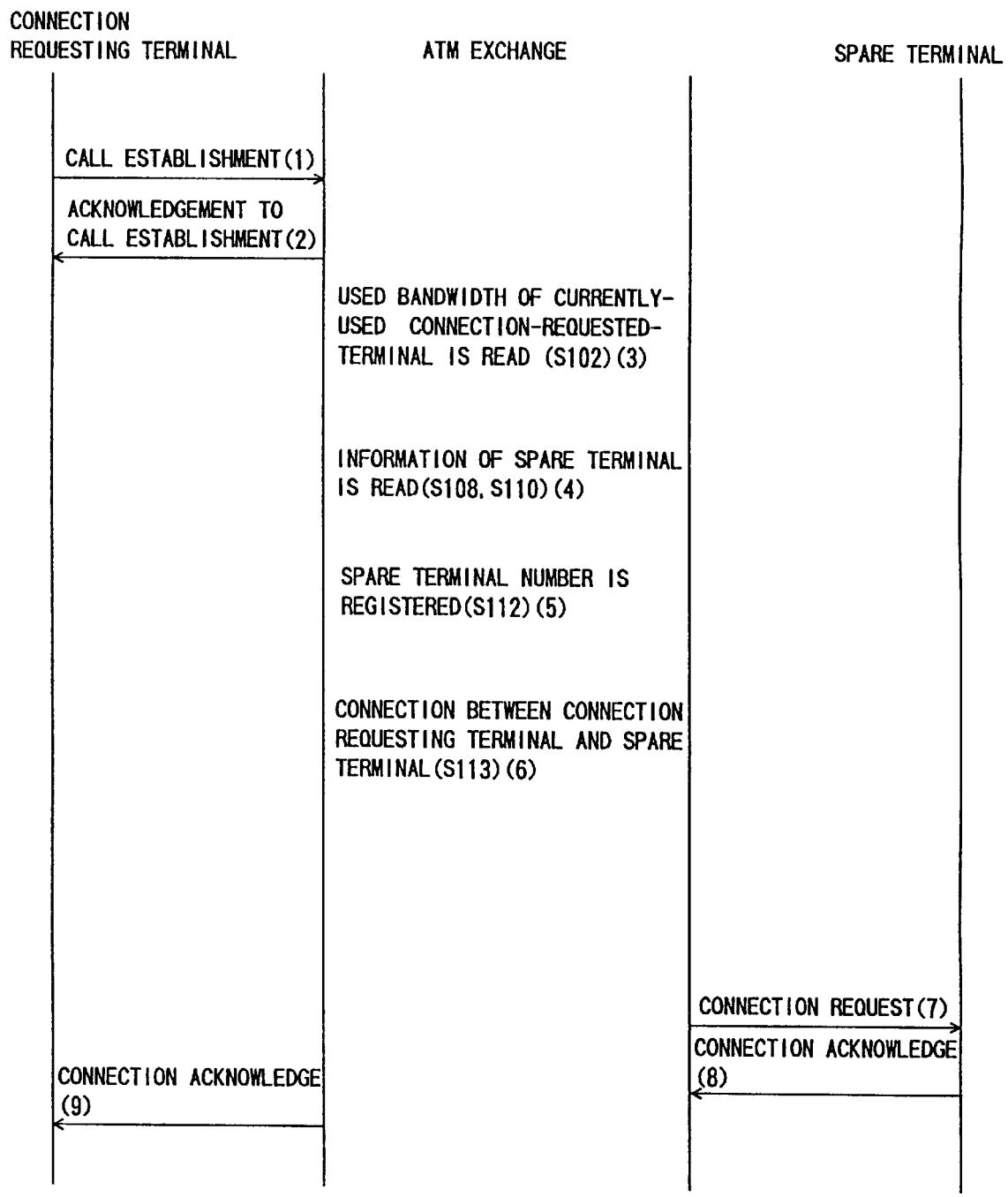
FIG. 16 is a sequence chart showing the operation inside the communication network shown in FIG. 11.
Figure 17:
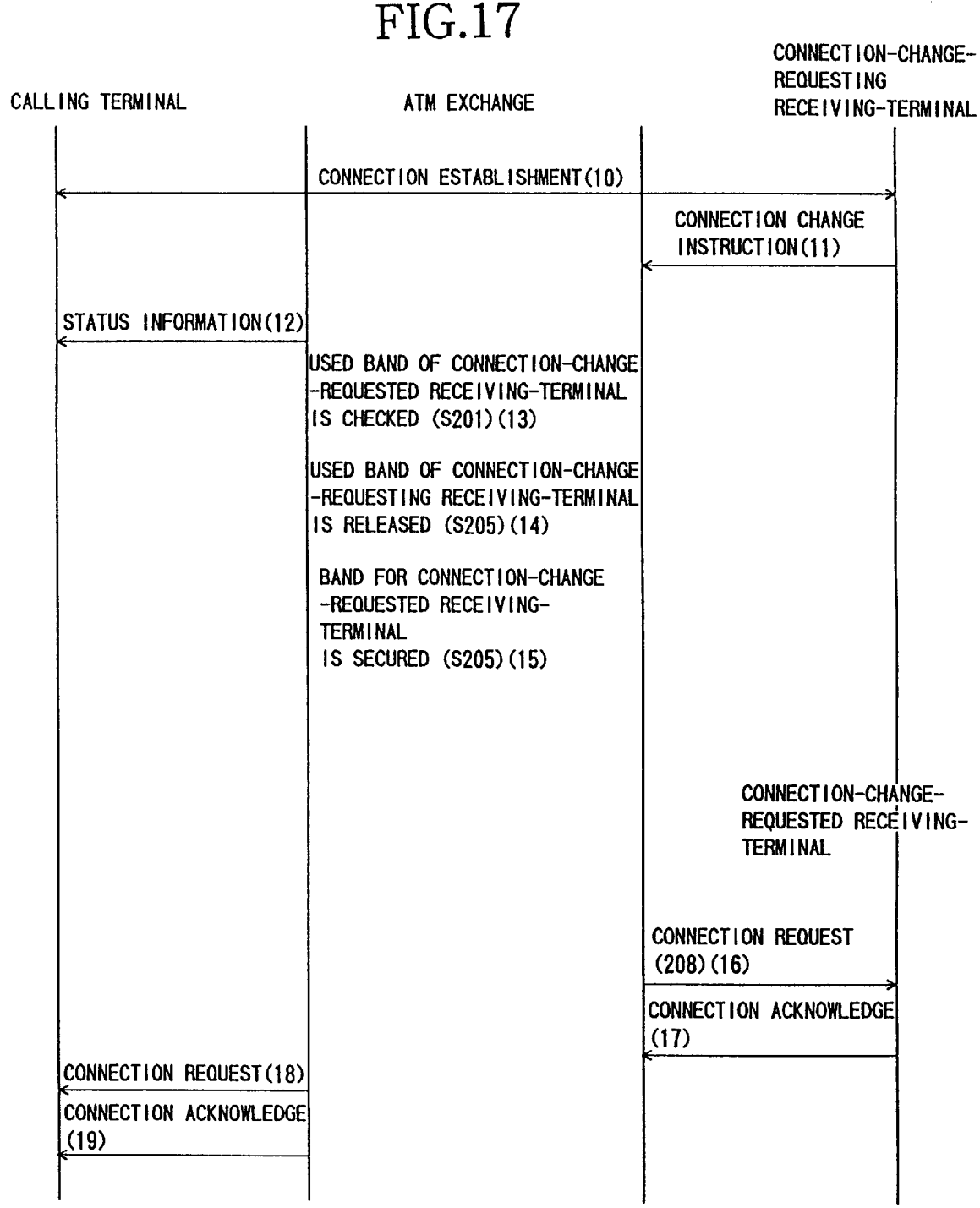
FIG. 17 is a sequence chart showing the operation inside the communication network shown in FIG. 11.
Figure 18:
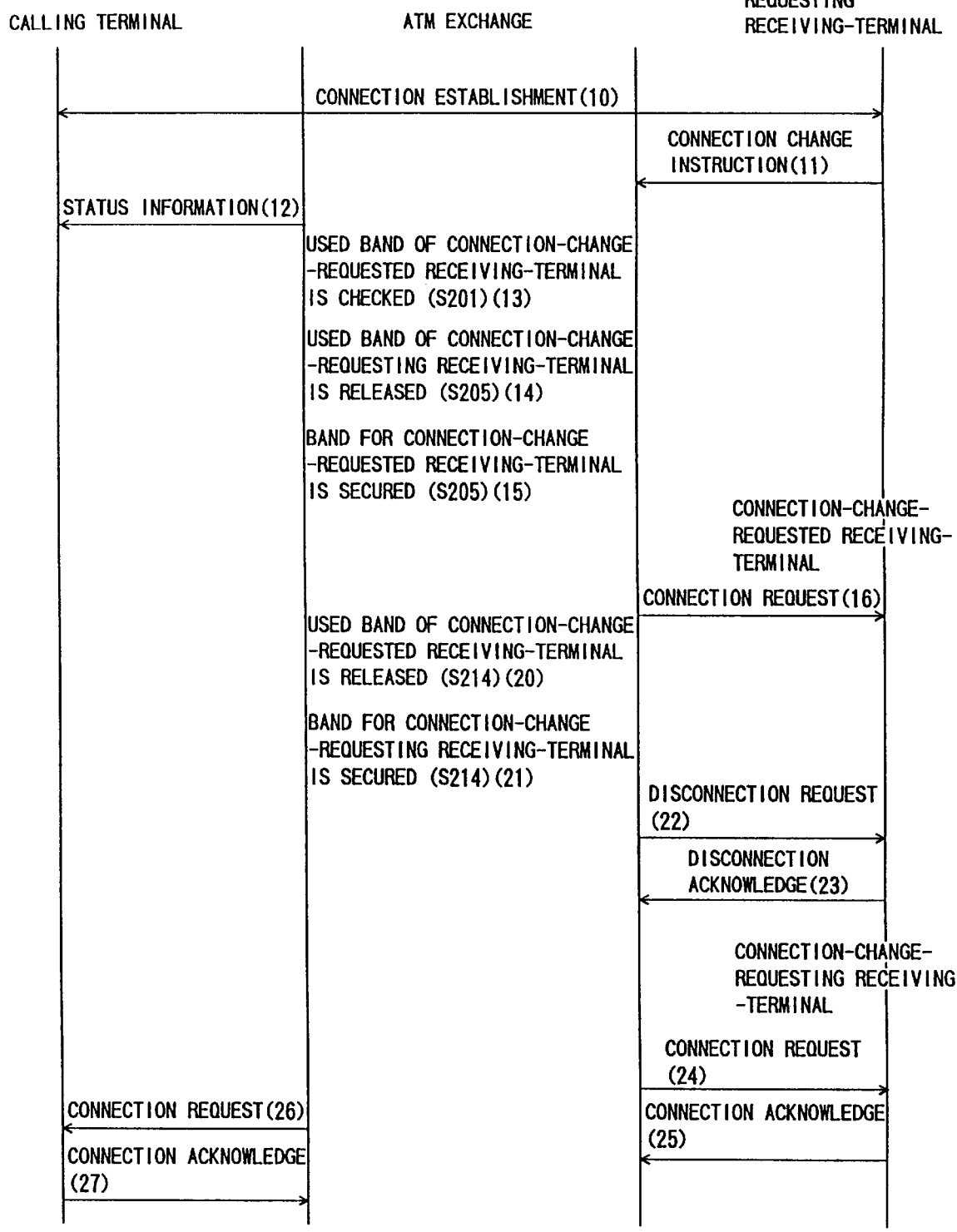
FIG. 18 is a sequence chart showing the operation inside the communication network shown in FIG. 11.

The general operation of the communication system associated with the execution of the connection process and the connection change process by the control apparatus 12 will be discussed below using sequence charts in FIGS. 16 through 18. In FIGS. 16–18, step numbers used in the flowcharts in FIGS. 13–15 are also given for the explanation of the associated operations of the ATM exchange 1.

Supposed that the connection requesting terminal sends a "call establishment" message indicating the initiation of call establishment to the ATM exchange 1 ((1)). In this case, the ATM exchange 1 sends an acknowledgement to the call establishment to the connection requesting terminal ((2)), and reads the used bandwidth of the currently-used connection requested terminal from the band management table 16 to check the status of the currently-used connection requested terminal (S102) ((3)). When connection to the currently-used connection requested terminal is not possible with the used bandwidth obtained in step S102, the ATM exchange 1 reads the terminal number of the spare terminal and the used bandwidth thereof from the first substitute terminal registration table 17 to find a transfer destination (S108, S110) ((4)). When the ATM exchange 1 checks the used bandwidth of the spare terminal read in step S110 and determines that the spare terminal is connectable, the ATM exchange 1 registers the terminal number of the spare terminal in the call control table 15 (S112) ((5)). Subsequently, the ATM exchange 1 executes the connection of the connection requesting terminal to the spare terminal (S113) ((6)). Then, the ATM exchange 1 sends a "connection request" message to the spare terminal ((7)). In response to this message, the spare terminal returns a "connection acknowledge" message indicating the reception of the "connection request" message to the ATM exchange 1 ((8)). In response to this message, the ATM exchange 1 sends a "connection acknowledge" message to the connection requesting terminal ((9)).

Suppose that, through the above processing, the spare terminal has sent a "connection change instructing" message instructing the change of the connection destination to a currently-used terminal, to the ATM exchange 1 ((11)) while the connection requesting terminal (calling terminal) is being connected to the spare terminal (receiving terminal) ((10)). In this case, the ATM exchange 1 sends a "status informing" message indicating the process of changing the connection destination is about to take place to the calling terminal ((12)). The ATM exchange 1 then checks the used band of the connection-change requested receiving terminal (currently-used terminal) (S201) ((13)). Then, the ATM exchange 1 frees the used band of the connection-change requesting receiving terminal (spare terminal) (S205) ((14)), and secures the used band of the connection-change requested receiving terminal (currently-used terminal) (S205) ((15)). Thereafter, the ATM exchange 1 sends a "connection request" message to the connection-change requested receiving terminal (currently-used terminal) (S208) ((16)).

Assume that a "connection acknowledge" message is returned from the connection-change requested receiving terminal (currently-used terminal) before the time passed since the transmission of this "connection request" message reaches the unanswered time registered in the unanswered time registration table 19 ((17)). In this case, the ATM exchange 1 sends a "connection request" message to the calling terminal ((18)). Upon reception of this connection request, the calling terminal sends a "connection acknowledge" message to the ATM exchange 1 ((19)). As a result, the connection destination is switched to the connection-change requested receiving terminal (currently-used terminal) from the connection-change requesting receiving terminal (spare terminal).

As opposed to the above assumption, suppose that a "connection acknowledge" message has not returned from the connection-change requested receiving terminal (currently-used terminal) even when the time passed since the transmission of this "connection request" message has reached the unanswered time registered in the unanswered time registration table 19. In this case, the ATM exchange 1 frees the used band of the connection-change requested receiving terminal (currently-used terminal) (S214) ((20)), and secures the used band of the connection-change requesting receiving terminal (spare terminal) (S214) ((21)). Thereafter, the ATM exchange 1 sends a "disconnection request" message to the connection-change requested receiving terminal (currently-used terminal) ((22)). The connection-change requested receiving terminal (currently-used terminal) having received this disconnection request sends a "disconnection acknowledge" message to the ATM exchange 1 ((23)). Then, the ATM exchange 1 sends a "connection request" message to the connection-change requesting receiving terminal ((24)). Upon reception of this connection request, the connection-change requesting receiving terminal (spare terminal) sends a "connection acknowledge" message to the ATM exchange 1 ((25)). Next, the ATM exchange 1 sends a "connection request" message to the calling terminal ((26)). Upon reception of the connection request, the calling terminal sends a "connection acknowledge" message to the ATM exchange 1 ((27)). As a result, the connection destination is switched back to the connection-change requesting receiving terminal (spare terminal).

According to this embodiment, when the terminal 6e makes a connection request to the currently-used display terminal while the currently-used display terminal is being connected to the terminal 6d, the terminal 6e is connected to the spare display device registered in the first substitute terminal registration table 17 as the substitute terminal for this currently-used display device.

Suppose that the connection between the currently-used display terminal and the terminal 6d is disconnected later and the terminal 6f is connected to the currently-used speaker terminal. In this case, the used bandwidths associated with the port 141 which is coupled to the TV conference terminal 6g are the bandwidth (60 Mbps) used by the spare display terminal and the bandwidth (30 Mbps) used by the currently-used speaker terminal. At this point of time, therefore, there is a free area of 66 Mbps available for this port 141.

Assume that the spare display terminal has requested to change the destination of connection of the terminal 6e to the currently-used display terminal. In this case, the bandwidth needed for the currently-used display terminal is 80 Mbps which exceeds the free area (66 Mbps) available at that time. Therefore, the bandwidth (60 Mbps) used by the spare display terminal is temporarily freed to provide a free area of 126 Mbps, thereafter, the terminal 6e is connected to the currently-used display device.

Since the free area then is 46 Mbps, the spare speaker terminal which uses 30 Mbps can be connected to one of the terminals.

Third Embodiment
Structure of Communication System

Figure 19:
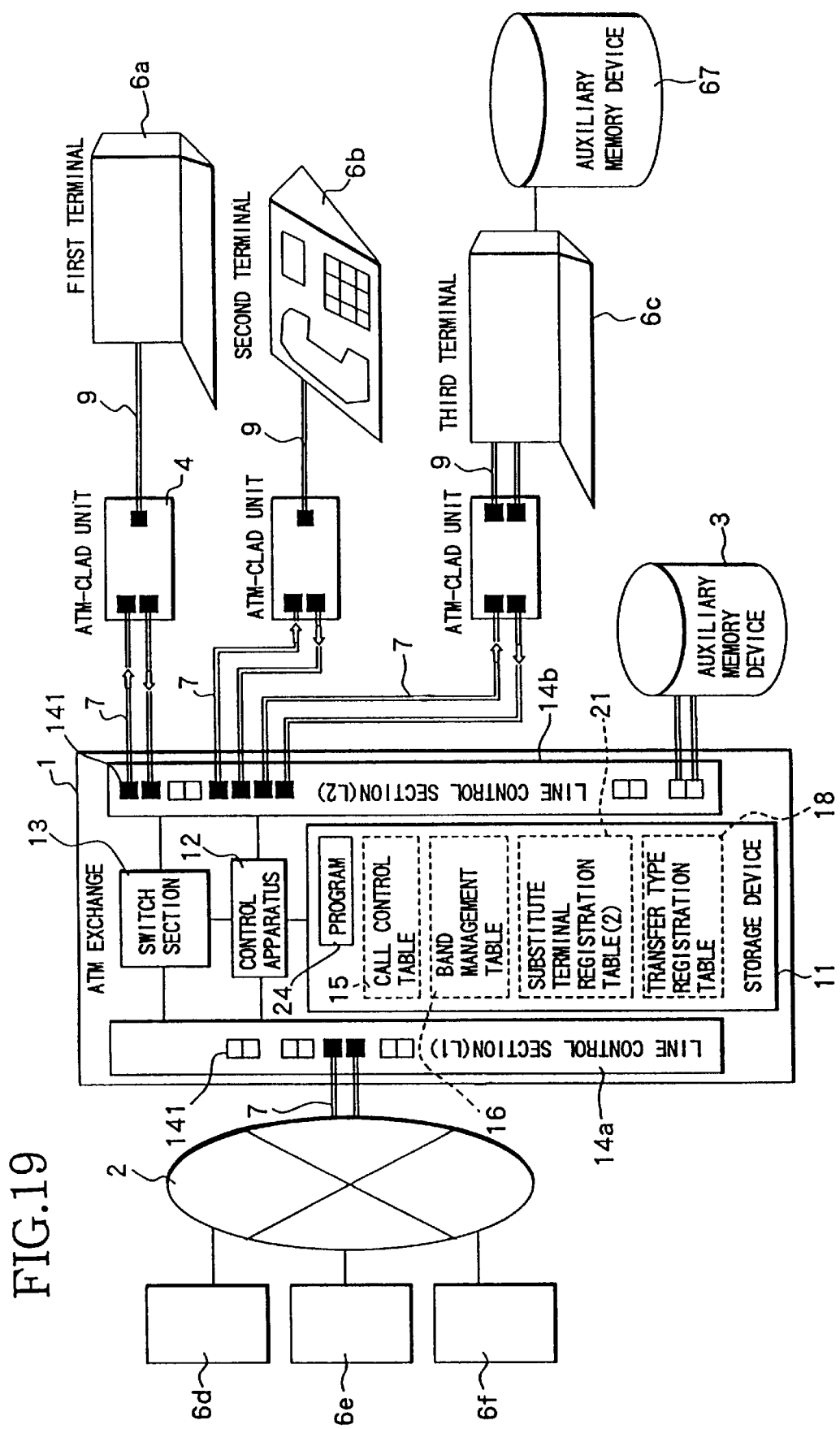
FIG. 19 is a block diagram showing the structure of a communication network in which an ATM exchange according to the third embodiment of this invention is used.

FIG. 19 presents a block diagram illustrating the structure of a communication network in which an ATM exchange 1 according to the third embodiment of this invention is used. Like or same reference numerals are given to those components in FIG. 19 which are the same as the corresponding components of the first embodiment.

The ATM exchange 1 according to the third embodiment differs from that of the first embodiment in that a second substitute terminal registration table 21 is stored instead of the first substitute terminal registration table 17 in the storage device 11 and one of the first to third terminals 6a to 6c is connected to each port 141 of the second line control section 14b via the ATM-CLAD unit 4. It is to be noted that the third terminal 6c in the third embodiment is assumed as a computer to which a large-capacity hard disk 67 is connected.

Figure 20:
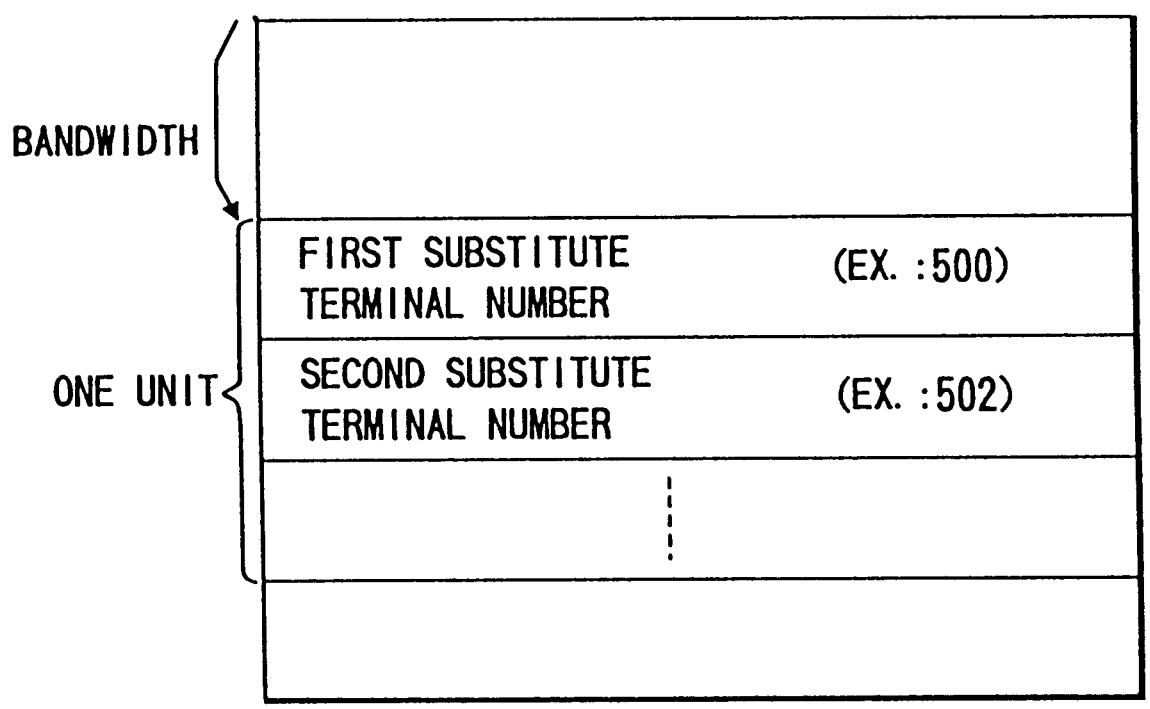
FIG. 20 is a structural diagram of a substitute terminal registration table (2) shown in FIG. 19.

Information associated with substitute terminals which are previously designated as a transfer destination when each terminal 6 is busy are classified for the individual bandwidths requested by the connection requesting terminal and registered in the second substitute terminal registration table 21. FIG. 20 shows the data structure of the second substitute terminal registration table 21. As shown in FIG. 20, the terminal numbers of a plurality of substitute terminals arranged in the priority order are written as one unit information for each bandwidth in the second substitute terminal registration table 21. The terminal number of the substitute terminal having the highest priority is called "first substitute terminal number" and the terminal number of the substitute terminal having the second highest priority is called "second substitute terminal number." The data set in the second substitute terminal registration table 21 are retrieved unit by unit with the bandwidths requested by the connection requesting terminal as indexes.

Because the other structure of the third embodiment is the same as that of the first embodiment, its description will not be repeated.

The details of the process the control apparatus 12 executes based on the program 24 in the storage device 11 will be discussed below with reference to flowchart in FIG. 21.

Connection Process

Figure 21:
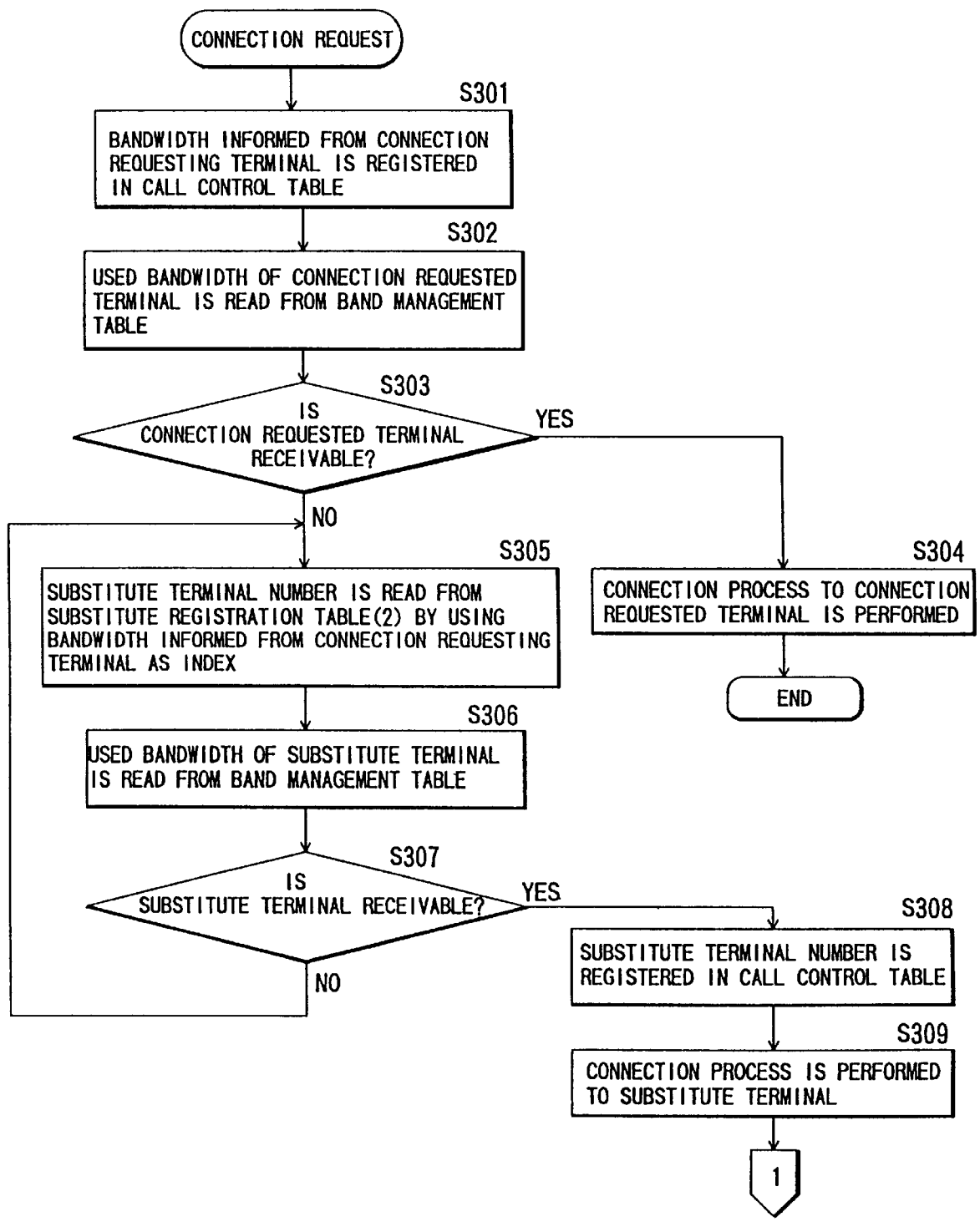
FIG. 21 is a flowchart illustrating connection process which are executed when a control apparatus shown in FIG. 20 receives a connection request from a terminal.

The connection process in FIG. 21 starts when any terminal or connection requesting terminal makes a connection request (upon reception of an ATM cell retaining the terminal number and the used bandwidth of the connection requested terminal, and a call establishing message, from the connection requesting terminal). In the first step S301 after the process starts, the control apparatus 12 registers the bandwidth requested by the connection requesting terminal in the call control table 15. In the next step S302, the control apparatus reads the used bandwidth of the connection requested terminal from the band management table 16. In the next step S303, the control apparatus 12 determines if the connection requested terminal can receive based on the used bandwidth read in step S302. Specifically, the control apparatus 12 determines that reception is possible when the used bandwidth is equal to or smaller than a predetermined value, and determines that reception is not possible when the used bandwidth is greater than the predetermined value. When reception is possible, the control apparatus 12 performs a connection process to the connection requested terminal in step S304. Specifically, the control apparatus 12 describes information about the connection requested terminal in the column for entry of information about the receiving terminal in the call control table 15 and sets the individual line control sections 14 in such a manner that an ATM cell from the connection requesting terminal is transferred to the connection requested terminal.

When reception is not possible, on the other hand, in step S305, the control apparatus 12 uses a bandwidth informed by the connection requesting terminal as an index so as to read one of the terminal numbers of substitute terminals associated with the bandwidth in the order of priority (the first substitute terminal number when it is the first time the loop process is executed, or the substitute terminal number equal to the number of times that the loop process is performed when the loop process is executed more than once). In the next step S306, the control apparatus 12 reads the used bandwidth of the substitute terminal whose terminal number has been read in step S305 from the band management table 16. Then, the control apparatus 12 determines in step S307 if the substitute terminal whose terminal number has been read out in step S305 is ready for reception. Specifically, the control apparatus 12 determines that reception is possible when the used bandwidth of the substitute terminal read in step S305 is equal to or smaller than a predetermined value and when the difference between the total value of the used bandwidths associated with the port 141 connected to that substitute terminal and the capacity of that port is equal to or greater than the informed used-band, and determines that reception is not possible otherwise. When reception is not possible, the control apparatus 12 returns to step S305 and reads the substitute terminal number with the next highest priority.

When a receivable substitute terminal is found by repeatedly executing this loop process, the control apparatus 12 registers the terminal number of that substitute terminal as "substitute terminal number" in the call control table 15 and registers the terminal number of the connection requested terminal as "transfer terminal number" in step S308. In the subsequent step S309, the control apparatus 12 executes a connection process for that substitute terminal. Specifically, the control apparatus 12 describes information about the substitute terminal in the column for entry of information about the receiving terminal in the call control table 15 and sets the individual line control sections 14 in such a manner that an ATM cell from the connection requesting terminal is transferred to the substitute terminal. Thereafter, the control apparatus 12 executes the process starting from step S014 illustrated in FIGS. 7 and 8.

Operation of Communication System

Figure 22:
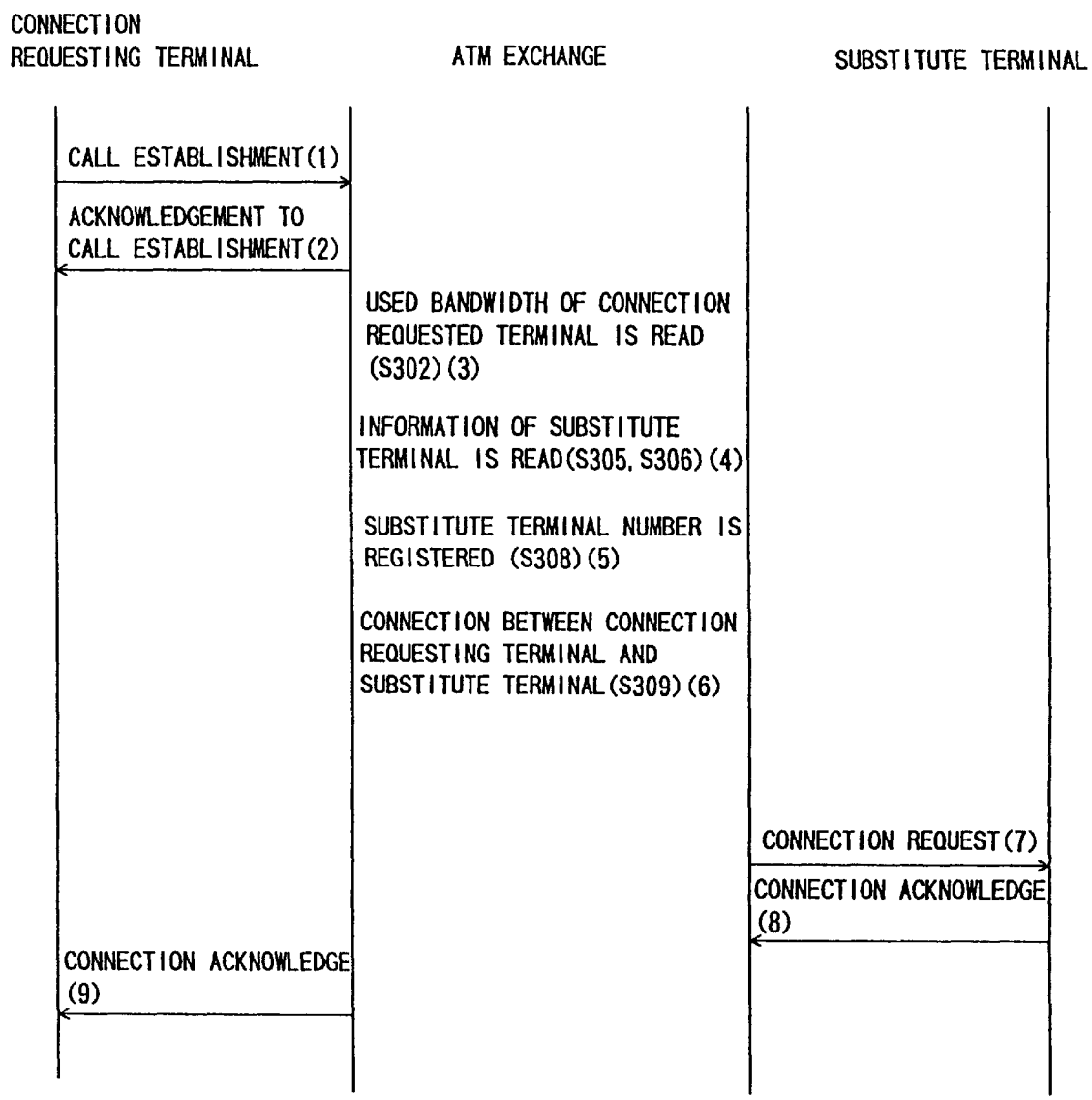
FIG. 22 is a sequence chart showing the operation inside the communication network shown in FIG. 20.

The general operation of the communication system associated with the execution of the connection process by the control apparatus 12 will be discussed below using sequence chart in FIG. 22. In FIG. 22, step numbers used in the flowchart in FIG. 21 are also affixed for the explanation of the associated operations of the ATM exchange 1.

First, the connection requesting terminal sends a "call establishment" message indicative of the initiating of call establishment to the ATM exchange 1 ((1)). The ATM exchange 1 sends an acknowledgement of the call establishment to the connection requesting terminal ((2)), and reads the used bandwidth of the connection requested terminal from the band management table 16 to check the status of the connection requested terminal (S302) ((3)). When the connection to the connection requested terminal is not possible with the used bandwidth obtained in step S302, the ATM exchange 1 reads the terminal number of the substitute terminal and the used bandwidth thereof from the second substitute terminal registration table 21 to find a transfer destination (S305, S306) ((4)). When the ATM exchange 1 checks the used bandwidth of the substitute terminal read in step S306, and when the substitute terminal is connectable, the ATM exchange 1 registers the terminal number of the substitute terminal in the call control table 15 (S308) ((5)). Subsequently, the ATM exchange 1 executes the connection of the connection requesting terminal to the substitute terminal (S309) ((6)). Then, the ATM exchange 1 sends a "connection request" message to the substitute terminal ((7)). In response to this message, the substitute terminal sends a "connection acknowledge" message indicating the reception of the "connection request" message to the ATM exchange 1 ((8)). In response to this message, the ATM exchange 1 sends a "connection acknowledge" message to the connection requesting terminal ((9)). Consequently, the connection requesting terminal is connected to the substitute terminal.

Fourth Embodiment

Structure of Communication System

Figure 23:
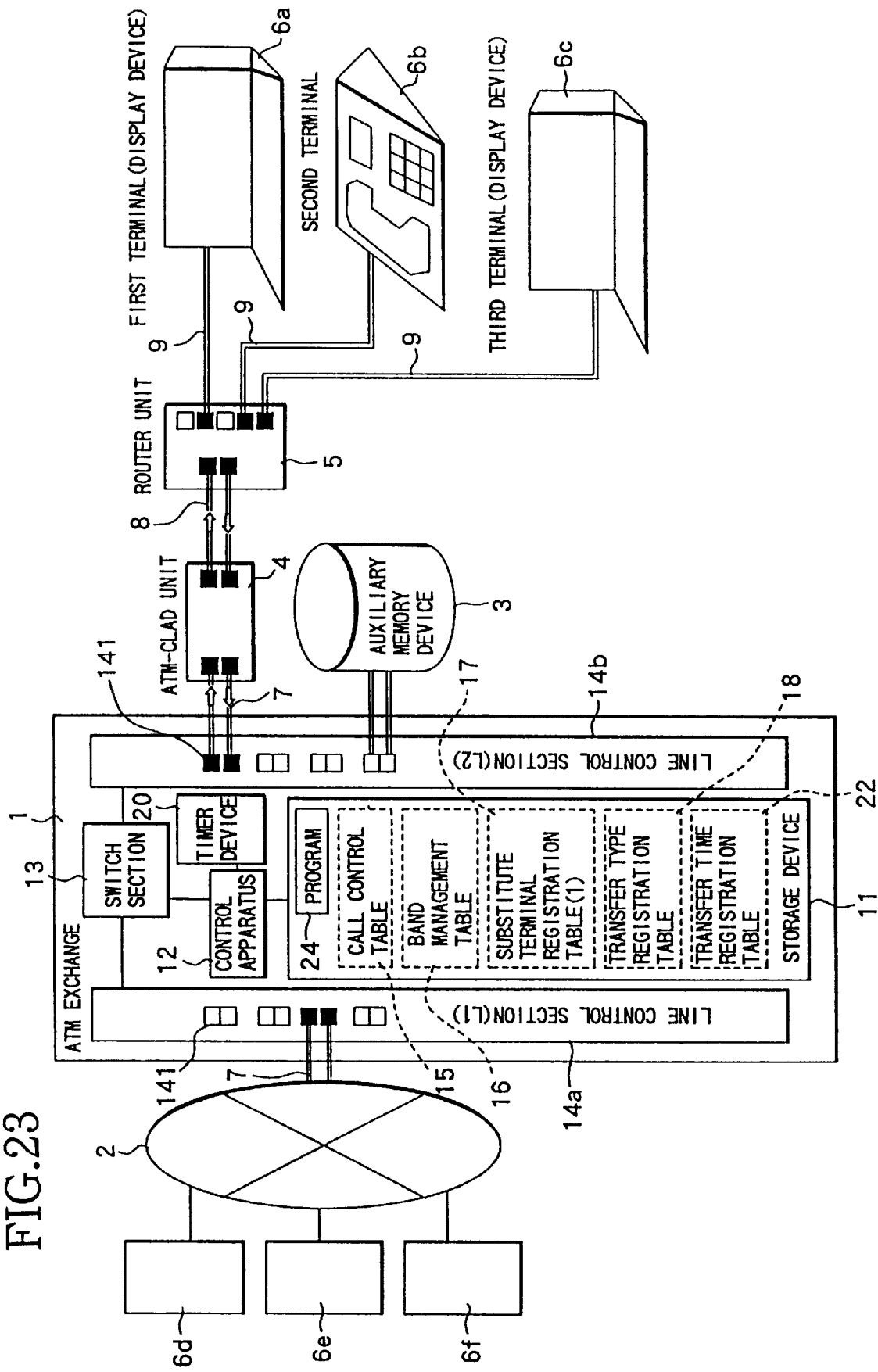
FIG. 23 is a block diagram showing the structure of a communication network in which an ATM exchange according to the fourth embodiment of this invention is used.

FIG. 23 presents a block diagram illustrating the structure of a communication network in which an ATM exchange according to the fourth embodiment of this invention is used. Like or same reference numerals are given to those components in FIG. 23 which are the same as the corresponding components of the first embodiment.

The ATM exchange 1 according to the fourth embodiment differs from that of the first embodiment in that a timer device 20 is connected to the control apparatus 12, and a transfer time registration table 22 is stored in the storage device 11.

The timer device 20 is a timer which gives current time information to the control apparatus 12.

Registered in the transfer time registration table 22 for each terminal 6 are information indicating the transferable time band and the transfer destination when that terminal 6 is busy. FIG. 24 shows the data structure of the transfer time registration table 22. As shown in FIG. 24, the time at which transfer becomes possible (transfer start time), the time at which transfer becomes disabled (transfer end time), and several combinations of transfer destinations are written for each terminal in the transfer time registration table 22 as an unit of information. The data set in the transfer time registration table 22 are retrieved unit by unit with the terminal number of the terminal associated with that unit as an index.

Because the other structure of the fourth embodiment is the same as that of the first embodiment, its description will not be repeated.

The details of the process the control apparatus 12 executes based on the program 24 in the storage device 11 will be discussed below with reference to flowchart in FIG. 25.

Connection Process

Figure 25:
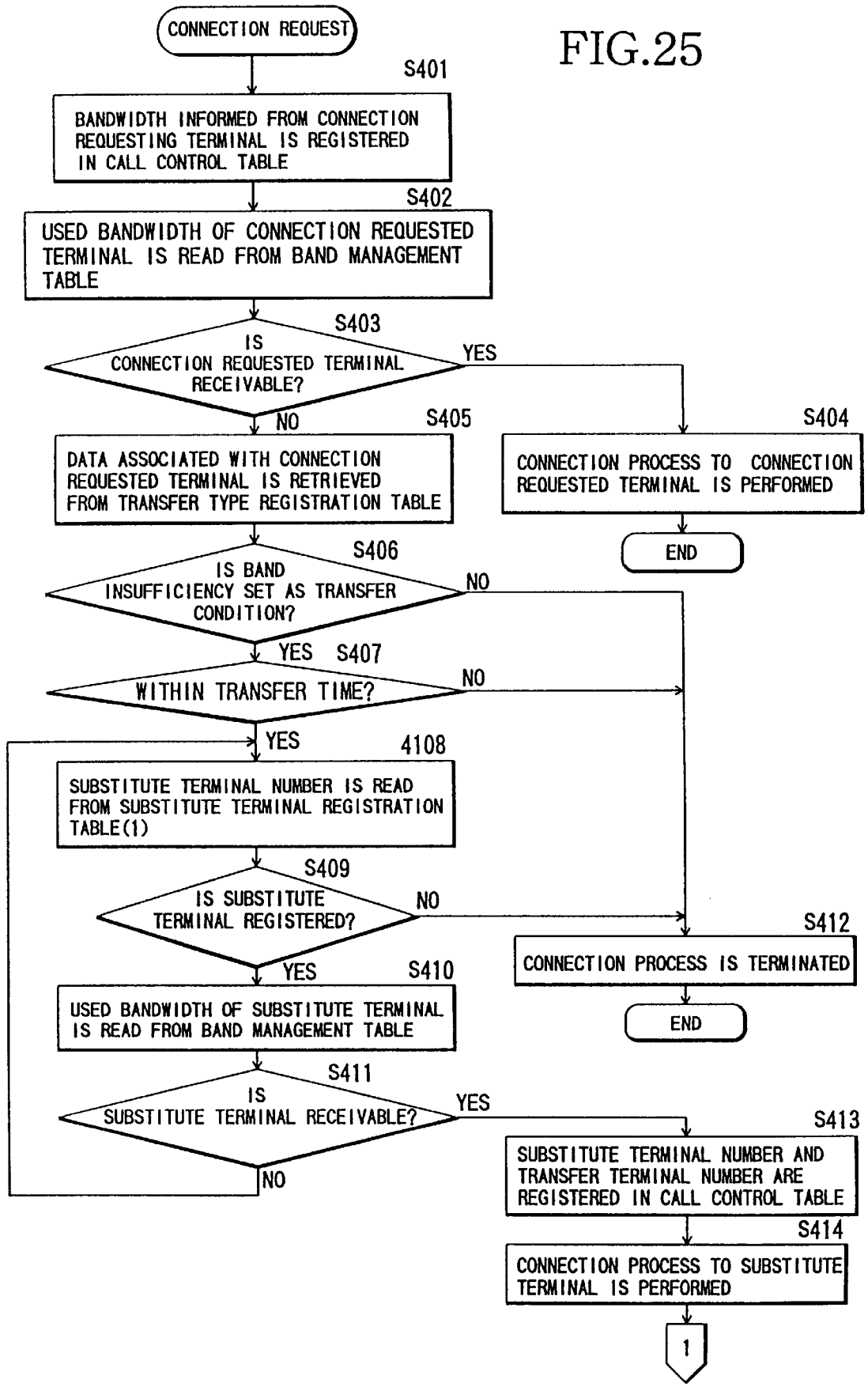
FIG. 25 is a flowchart illustrating connection process which are executed when a control apparatus shown in FIG. 23 receives a connection request from a terminal.

The connection process in FIG. 25 starts when any terminal or connection requesting terminal makes a connection request (upon reception of an ATM cell retaining the terminal number and the used bandwidth of the connection requested terminal, and a call establishing message, from the connection requesting terminal). In the first step S401 after the process starts, the control apparatus 12 registers the bandwidth requested by the connection requesting terminal in the call control table 15. In the next step S402, the control apparatus 12 reads the used bandwidth of the connection requested terminal from the band management table 16. In the next step S403, the control apparatus 12 determines if the connection requested terminal can receive based on the used bandwidth read in step S402. Specifically, the control apparatus 12 determines that reception is possible when the used bandwidth is equal to or smaller than a predetermined value, and determines that reception is not possible when the used bandwidth is greater than the predetermined value. When reception is possible, the control apparatus 12 performs a connection process to the connection requested terminal in step S404. Specifically, the control apparatus 12 describes information about the connection requested terminal in the column for entry of information about the receiving terminal in the call control table 15 and sets the individual line control sections 14 in such a manner that an ATM cell from the connection requesting terminal is transferred to the connection requested terminal.

When reception is not possible, on the other hand, the control apparatus 12 reads data associated with the connection requested terminal from the transfer type registration table 18 based on the terminal number of the connection requested terminal in step S405. In the next step S406, the control apparatus 12 checks if insufficient band is set as a transfer condition in the data read in step S405. When band insufficiency is not set as a transfer condition, the control apparatus 12 terminates the connection process in step S412.

When band insufficiency is set as a transfer condition, on the other hand, the control apparatus 12 checks in step S407 if the current time given from the timer device 20 is after the transfer start time and before the transfer end time, and the transfer start time and transfer end time are set in the transfer time registration table 22 as those associated with the connection requesting terminal. When the current time is neither after the transfer start time nor before the transfer end time, the control apparatus 12 considers that the time is out of the transferable time band and terminates the connection process in step S412.

When the current time is after the transfer start time and before the transfer end time, the control apparatus 12 determines that the time lies within the transferable time band and executes the loop process from steps S408 to S411. In the first step S408 in this loop process, the control apparatus 12 reads one of the terminal numbers of substitute terminals associated with the connection requested terminal from the first substitute terminal registration table 18 in the order of priority (the first substitute terminal number when it is the first time that the loop process is executed, or the substitute terminal number equal to the number of times that the loop process is performed when the loop process is executed more than once). Next, the control apparatus 12 checks in step S409 if reading of the substitute terminal number in step S408 is successful, i.e., if the substitute terminal number equal to the number of times that the loop process is executed is registered in the first substitute terminal registration table 17. When the substitute terminal number equal to the number of times that the loop process is executed is not registered in the first substitute terminal registration table 17, the control apparatus 12 terminates the connection process S412. When the substitute terminal number equal to the number of times that the loop process is executed is registered in the first substitute terminal registration table 17, however, the control apparatus 12 reads the used bandwidth of the substitute terminal whose terminal number has been read in step S408 from the band management table 16 in step S410. Then, the control apparatus 12 determines in step S411 if the substitute terminal whose terminal number has been read out in step S408 is ready for reception. Specifically, the control apparatus 12 determines that reception is possible when the used bandwidth of the substitute terminal read in step S410 is equal to or smaller than a predetermined value and when the difference between the total value of the used bandwidths associated with the port 141 connected to that substitute terminal and the capacity of that port is equal to or greater than the informed used band, and determines that reception is not possible otherwise. When reception is not possible, the control apparatus 12 returns to step S408 and reads the substitute terminal number with the next highest priority.

When a receivable substitute terminal is found by repeatedly executing this loop process, the control apparatus 12 registers the terminal number of that substitute terminal as "substitute terminal number" in the call control table 15 and registers the terminal number of the connection requested terminal as "transfer terminal number" in step S413. In the subsequent step S414, the control apparatus 12 executes a connection process for that substitute terminal. Specifically, the control apparatus 12 describes information about the substitute terminal in the column for entry of information about the receiving terminal in the call control table 15 and sets the individual line control sections 14 in such a manner that an ATM cell from the connection requesting terminal is transferred to the substitute terminal. Thereafter, the control apparatus 12 executes the processing starting from step S014 illustrated in FIGS. 7 and 8.

Operation of Communication System

Figure 26:
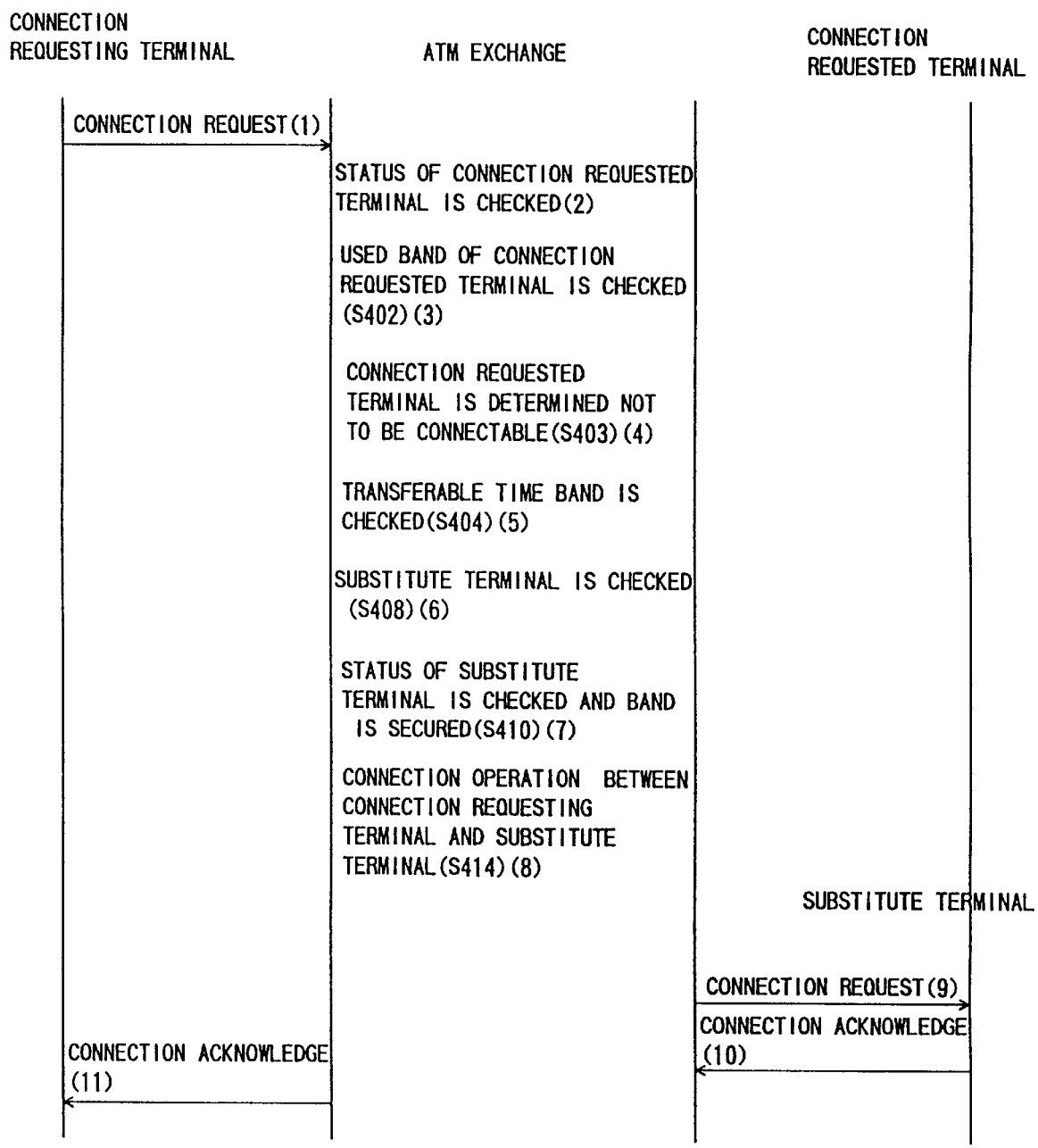
FIG. 26 is a sequence chart showing the operation inside the communication network shown in FIG. 23.

The general operation of the communication system associated with the execution of the connection process by the control apparatus 12 will be discussed below using sequence chart in FIG. 26. In FIG. 26, step numbers used in the flowchart in FIG. 25 are also affixed for the explanation of the associated operations of the ATM exchange 1.

First, the connection requesting terminal sends a "connection request" message to the ATM exchange 1 ((1)). Upon reception of the connection request, the ATM exchange 1 checks status of the connection requested terminal ((2)), and checks the used bandwidth of the connection requested terminal referring to the band management table 16 (S402) ((3)). Suppose that at this time, the ATM exchange 1 has determined based on the used band checked in step S402 that the connection requested terminal is not connectable (S403) ((4)). In this case, the ATM exchange 1 checks the time band that allows transfer to the substitute terminal by referring to the transfer time registration table 22 (S404) ((5)). When the current time lies within the transferable time band, the ATM exchange 1 checks the substitute terminal associated with the connection requested terminal by referring to the first substitute terminal registration table 17 (S408) ((6)). Then, the ATM exchange 1 checks the status of the substitute terminal and secures the band necessary for communication with the substitute terminal (S410) ((7)). Subsequently, the ATM exchange 1 executes the operation to connect the connection requesting terminal to the substitute terminal (S414) ((8)). Then, the ATM exchange 1 sends a "connection request" message to the substitute terminal ((9)). In response to this message, the substitute terminal sends a "connection acknowledge" message indicating the reception of the "connection request" message to the ATM exchange 1 ((10)). In response to this message, the ATM exchange sends a "connection acknowledge" message to the connection requesting terminal ((11)). Consequently, the connection requesting terminal is connected to the substitute terminal.

Fifth Embodiment

Structure of Communication System

Figure 27:
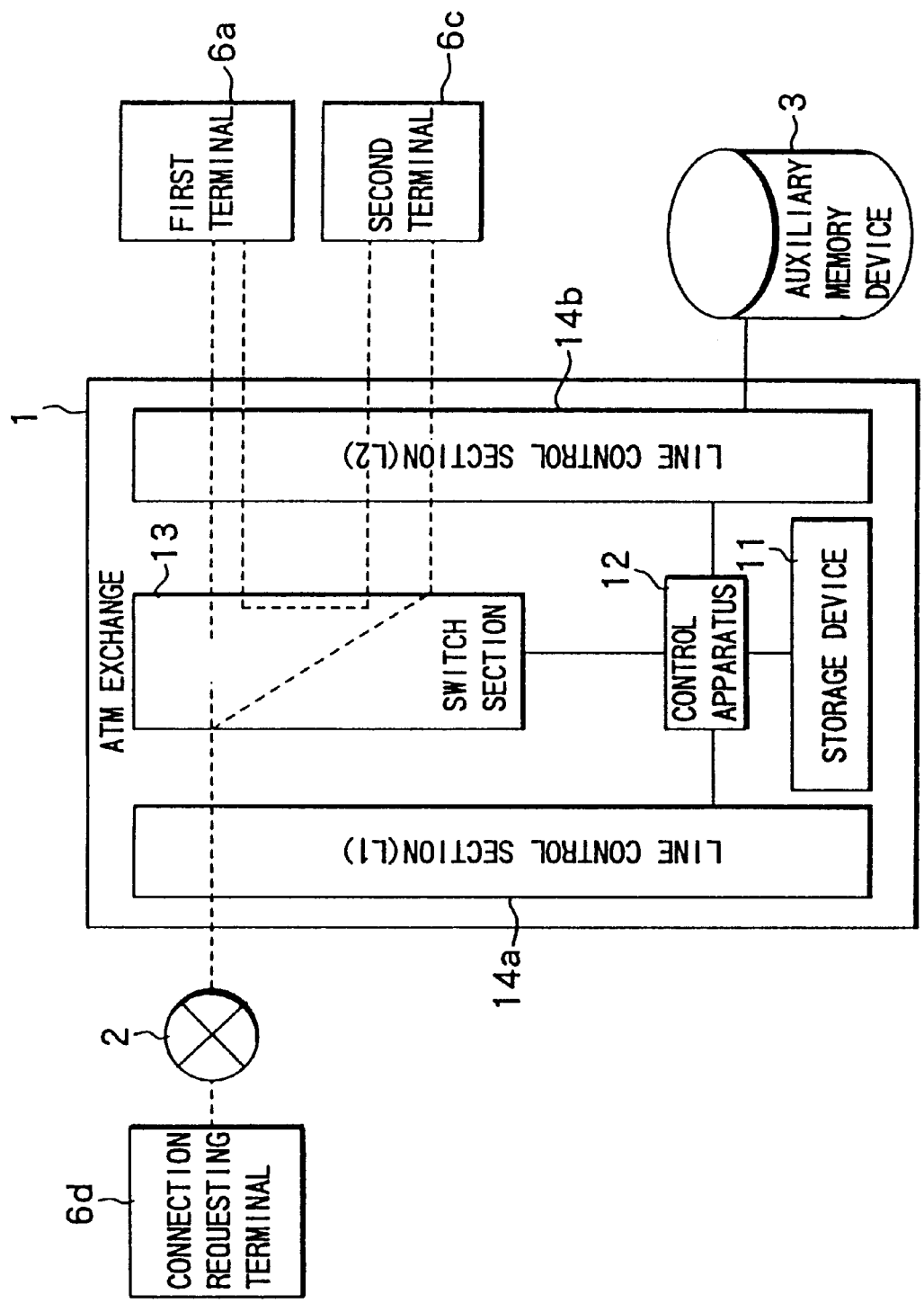
FIG. 27 is a block diagram showing the structure of a communication network in which an ATM exchange according to the fifth embodiment of this invention is used.

FIG. 27 presents a block diagram illustrating the structure of a communication network in which an ATM exchange according to the fifth embodiment of this invention is used. The ATM exchange 1 according to the fifth embodiment is characterized in that when a request to change the connection destination from the connected substitute terminal as a receiving terminal to the original connection requested terminal is made, the ATM exchange 1 establishes a communication path between the connection requesting terminal and the connection requested terminal and also establishes a communication path between the substitute terminal and the connection requested terminal, thereby allowing data which the substitute terminal has been receiving to be transferable to the connection requested terminal. Because the other structure of the fifth embodiment is quite the same as that of the first embodiment, its description will not be repeated.

The details of the process the control apparatus 12 executes based on the program in the storage device 11 will be discussed below with reference to flowcharts in FIGS. 28 and 29.

Connection Process

Figure 28:
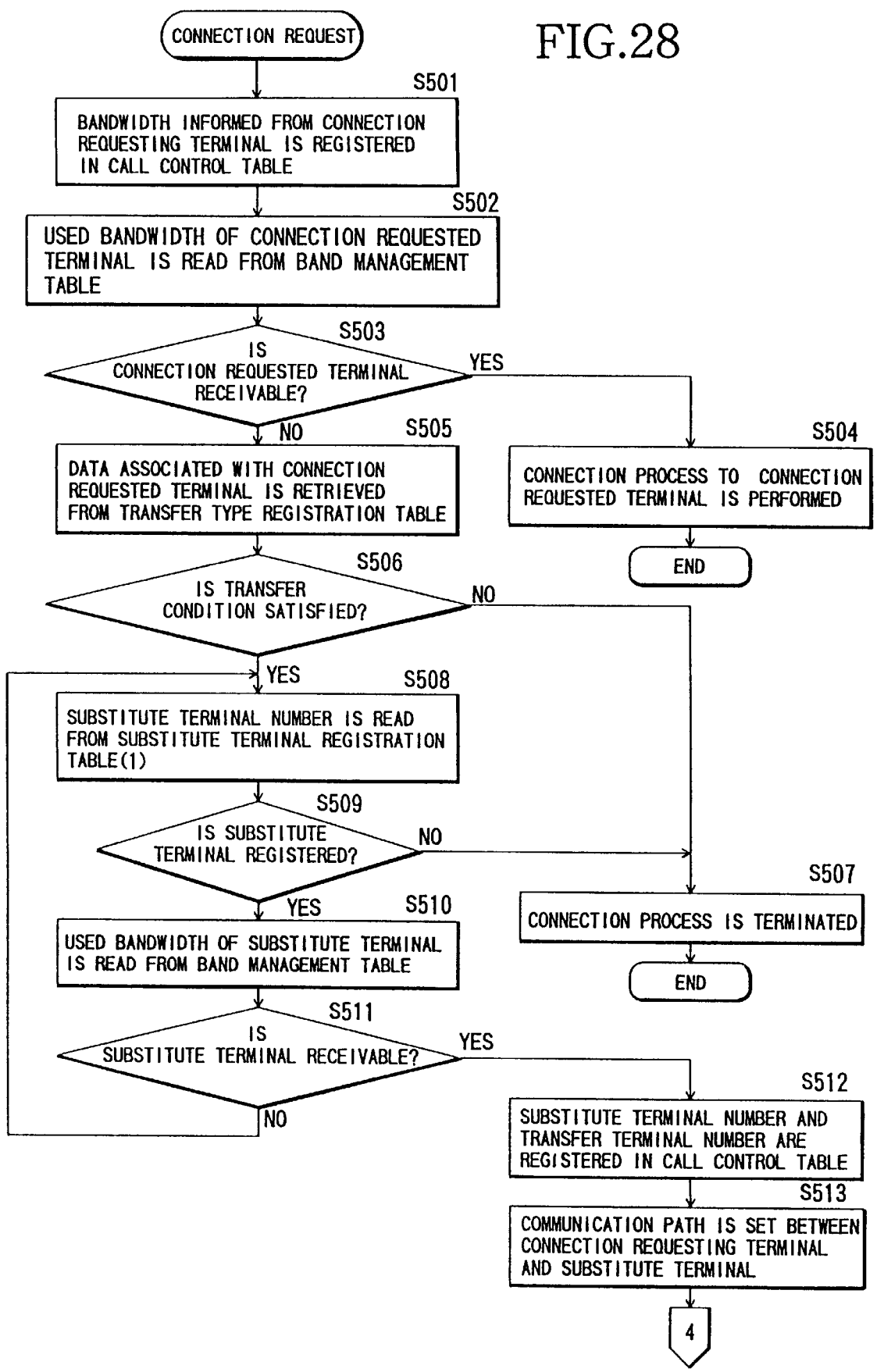
FIG. 28 is a flowchart illustrating connection process which are executed when a control apparatus shown in FIG. 27 receives a connection request from a terminal.
Figure 29:
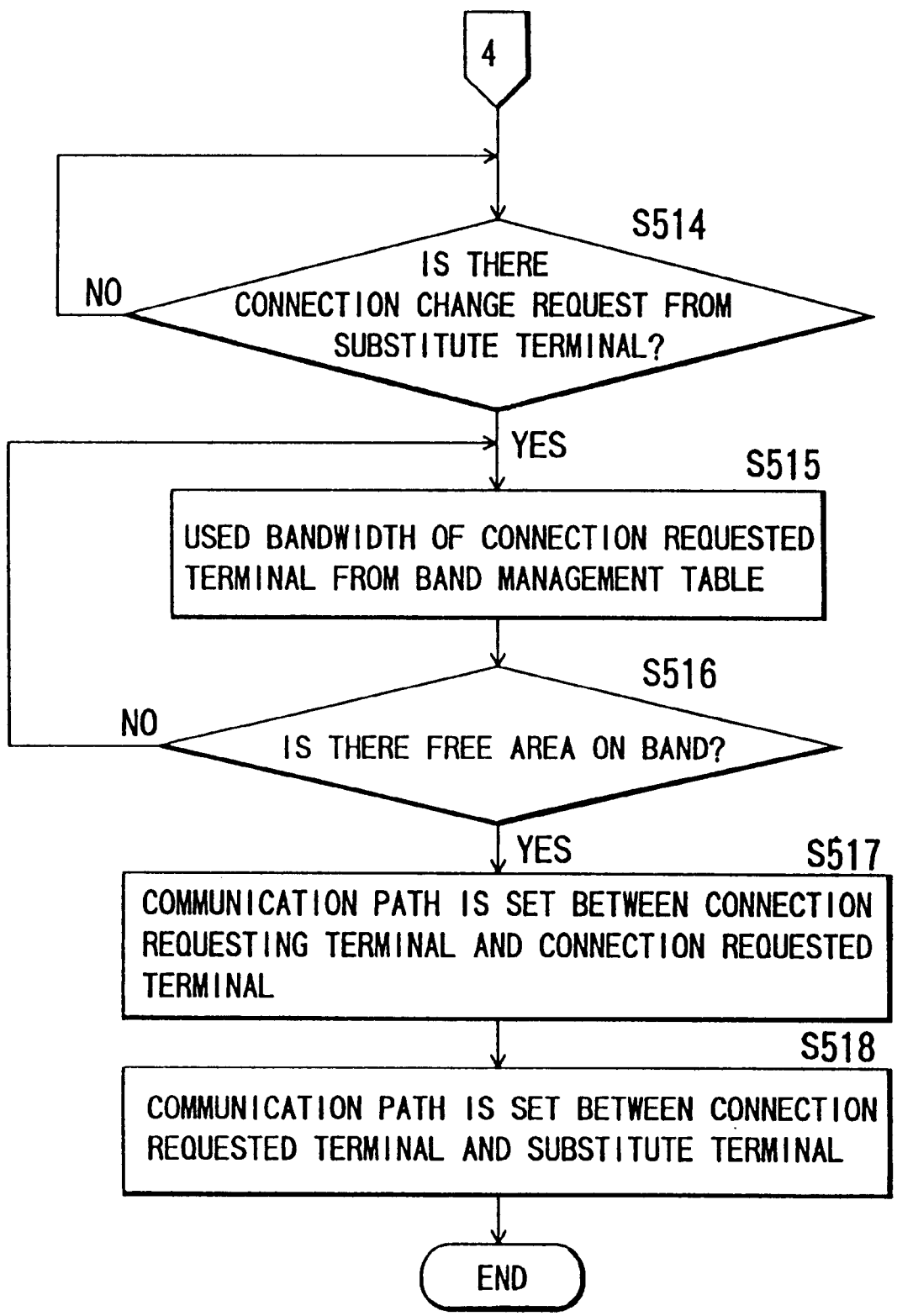
FIG. 29 is a flowchart illustrating connection process which are executed when the control apparatus shown in FIG. 27 receives a connection request from a terminal.

The connection process in FIG. 28 starts when any terminal or connection requesting terminal makes a connection request (upon reception of an ATM cell retaining the terminal number and the used bandwidth of the connection requested terminal, and a call establishing message, from the connection requesting terminal). Since the process from steps S501 to S512 in FIG. 28 is quite the same as the process from steps S001 to S012 in FIG. 6, its description will be omitted.

In step S513, the control apparatus 12 establishes a communication path between the connection requesting terminal 6d and the substitute terminal. Specifically, the control apparatus 12 describes information about the substitute terminal in the column for entry of information about the receiving terminal in the call control table 15 and sets the individual line control sections 14 in such a manner that an ATM cell from the connection requesting terminal is transferred to the substitute terminal.

In the next step S514, the control apparatus 12 waits for the substitute terminal (receiving terminal) to make a request to change the reception destination to the connection requested terminal (transfer terminal). When the substitute terminal (receiving terminal) has made this connection change request, the control apparatus 12 reads the used bandwidth of the connection requested terminal from the band management table 16 in step S515. In the next step S516, the control apparatus 12 determines if the used band of the connection requested terminal has any free area based on the used bandwidth read in step S515. Specifically, the control apparatus 12 determines that there is a free area when the used bandwidth is equal to or smaller than a predetermined value, and determines that there is no free area otherwise. When there is no free area, the control apparatus 12 returns to step S515 and waits until any free area becomes available.

When determining through the repeated checking in steps S515 and S516 that a free area is available, the control apparatus 2 establishes a communication path between the connection requesting terminal 6d and the connection requested terminal (transfer terminal) in step S517. Specifically, the control apparatus 12 sets new unit data involving the connection requesting terminal as a calling terminal and the connection requested terminal as a receiving terminal in the call control table 15. Then, the control apparatus 12 establishes a communication path between the connection requested terminal and the substitute terminal. Specifically, the control apparatus 12 sets new unit data involving the substitute terminal as a calling terminal and the connection requested terminal as a receiving terminal in the call control table 15.

Operation of Communication System

Figure 30:
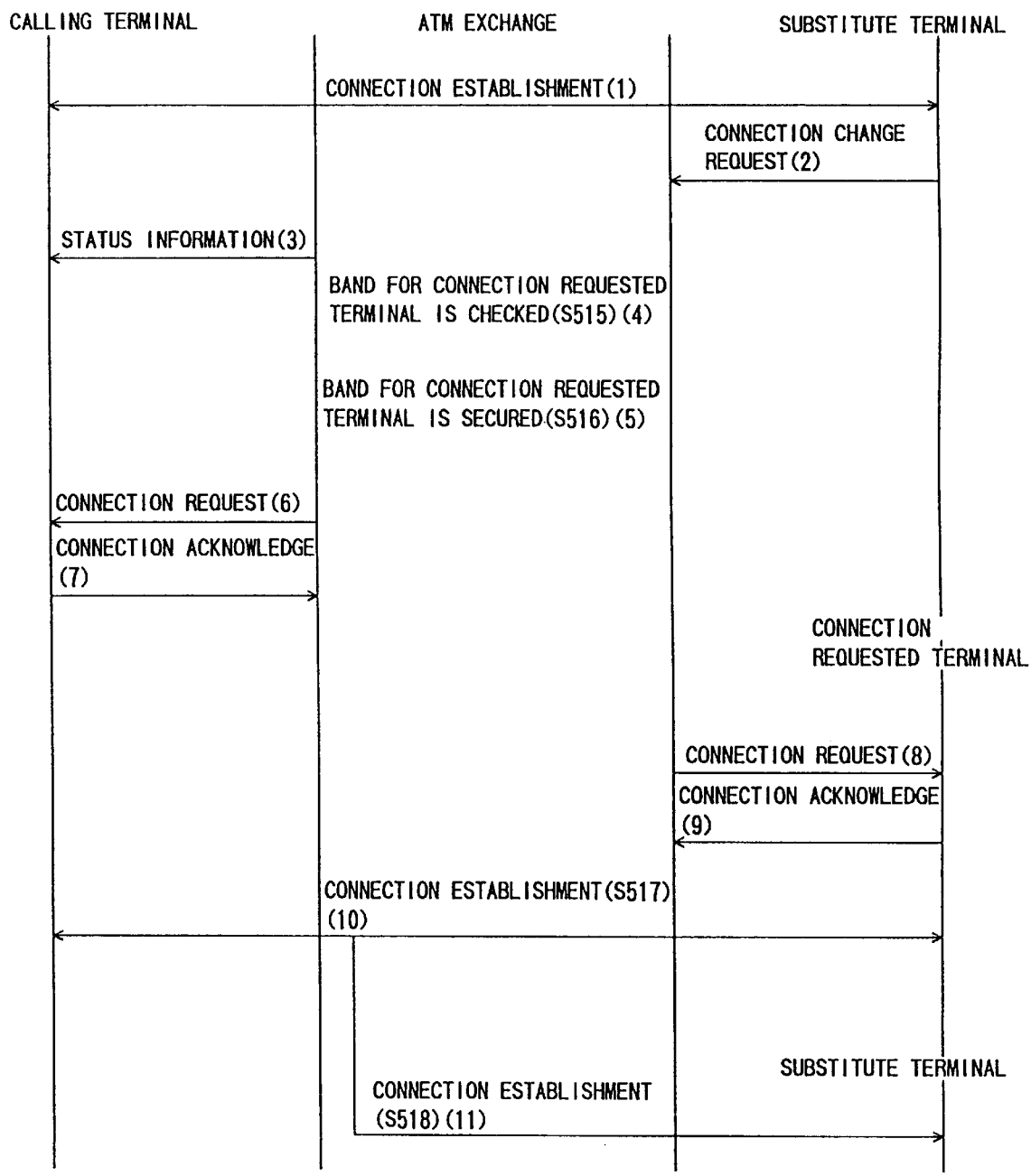
FIG. 30 is a sequence chart showing the operation inside the communication network shown in FIG. 27.

The general operation of the communication system associated with the execution of the connection process by the control apparatus 12 will be discussed below with sequence chart in FIG. 30. In FIG. 30, step numbers used in the flowcharts in FIGS. 28 and 29 are also affixed for the explanation of the associated operations of the ATM exchange 1.

Suppose that while the connection requesting terminal (calling terminal) is being connected to the substitute terminal (receiving terminal) ((1)), the substitute terminal (receiving terminal) has made a request to change the connection destination to the ATM exchange 1 ((2)). In this case, the ATM exchange 1 informs the connection requesting terminal (calling terminal) of the connection change request having been acknowledged ((3)). Then, the ATM exchange 1 checks the used bandwidth of the connection requested terminal (S515) ((4)), and secures the band for the connection requested terminal (S516) ((5)). Next, the ATM exchange 1 requests the connection requesting terminal (calling terminal) to establish connection to the connection requested terminal ((6)). The connection requesting terminal (calling terminal) having received the connection request sends a "connection acknowledge" message to the ATM exchange 1 ((7)). The ATM exchange 1 requests the substitute terminal to establish connection to the connection requested terminal ((8)). The substitute terminal having received the connection request returns a "connection acknowledge" message to the ATM exchange ((9)). The sequence up to this point causes the connection requesting terminal to be connected to the connection requested terminal (S517) ((10)). At the same time, the substitute terminal is connected to the connection requested terminal (S518) ((11)).

When the connection requesting terminal 6d has made a connection request to the first terminal 6a for a right person in charge but fails to establish the connection due to a band insufficiency, the ATM exchange 1 according to the fifth embodiment can establish connection to the third terminal 6c which is terminal (substitute terminal) for a subordinate person in charge. Consequently, the user who uses the connection requesting terminal 6d can communicate with the subordinate person who uses the third terminal 6c. When the subordinate person thinks it necessary to transmit to the right person in charge, this subordinate person has only to make a connection change request using the third terminal 6c. In response to this connection change request, the ATM exchange 1 can connect the connection requesting terminal 6d to the first terminal 6a to permit communication therebetween and can connect the third terminal 6c to the first terminal 6a to transfer the information in the third terminal 6c to the first terminal 6a while securing the band for the first terminal 6a.

The ATM exchange embodying this invention is provided with the substitute terminal registration table that has registered the second terminal which is used as a substitute terminal when the first terminal which has been designated as the connection destination is not connectable. If connection to the connection requested terminal which is designated by a certain terminal cannot be made, therefore, the control section reads a substitute terminal for this connection requested terminal from the substitute terminal registration table and can establish connection between this certain terminal and the substitute terminal. This reduces the number of possible rejections of the connection on the caller side, reduces the standby time and eliminates the need for repetitive attempts to make the connection.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. An ATM exchange connected to a plurality of transmission paths respectively connected to terminals comprising:

a switch section having a communication path set therein to connect one terminal to another terminal and transmitting a cell sent from said one terminal to said another terminal through said communication path;

a substitute terminal registration table in which a second terminal to be a substitute for a first terminal as a substitute terminal is registered;

a control section, in a case that a third terminal requests said control section to set said communication path in which said first terminal is set as a connection destination connecting said communication path between said third terminal and said first terminal when setting of said communication path between said third terminal and said first terminal is possible, otherwise connecting said communication path between said third terminal and said second terminal registered in said substitute terminal registration table when setting of said communication path is not possible;

wherein substitute terminals grouped by bandwidth are serially registered in said substitute terminal registration table in order of the bandwidth; and said control section retrieves said second terminal, which can become a substitute terminal for said first terminal, from said substitute terminal registration table by using a band size requested by said third terminal as an index, and establishes said communication path between said third terminal and said second terminal which is retrieved.

2. An ATM exchange, connected to a plurality of transmission paths respectively connected to terminals, comprising:

a switch section having a communication path set therein to connect one terminal to another terminal and transmitting a cell sent from said one terminal to said another terminal through said communication path;

a substitute terminal registration table in which a second terminal to be a substitute for a first terminal as a substitute terminal is registered;

a control section, in a case that a third terminal requests said control section to set said communication path in which said first terminal is set as a connection destination, connecting said communication path between said third terminal and said first terminal when setting of said communication path between said third terminal and said first terminal is possible, otherwise connecting said communication path between said third terminal and said second terminal registered in said substitute terminal registration table when setting of said communication path is not possible;

wherein an informing band is previously secured between said first terminal and said control section, wherein said informing band is a separate channel used to send information to the terminal; and when a communication path is established between said third terminal and said second terminal, said control section informs said first terminal of information about said communication path by using said informing band.

3. An ATM exchange connected to a plurality of transmission paths respectively connected to terminals, comprising:

a switch section having a communication path set therein to connect one terminal to another terminal and transmitting a cell sent from said one terminal to said another terminal through said communication path;

a substitute terminal registration table in which a second terminal to be a substitute for a first terminal as a substitute terminal is registered;

a control section, in a case that a third terminal requests said control section to set said communication path in which said first terminal is set as a connection destination, connecting said communication path between said third terminal and said first terminal when setting of said communication path between said third terminal and said first terminal is possible, otherwise connecting said communication path between said third terminal and said second terminal registered in said substitute terminal registration table when setting of said communication path is not possible;

wherein when said control section is requested to change a connection destination of said communication path for said third terminal after establishing said communication path between said third terminal and one of said first terminal and said second terminal, said control section frees a band assigned to said terminal connected to said third terminal via said communication path and then changes said connection destination of said communication path for said third terminal to one of said first terminal and said second terminal.

4. The ATM exchange according to claim 3, wherein when said second terminal requests said control section to change a connection destination of said communication path for said third terminal to said first terminal after establishing said communication path between said third terminal and said second terminal, said control section frees a band assigned to said second terminal and then establishes a communication path between said third terminal and said first terminal.

5. An ATM exchange connected to a plurality of transmission paths respectively connected to terminals, comprising:

a switch section having a communication path set therein to connect one terminal to another terminal and transmitting a cell sent from said one terminal to said another terminal through said communication path;

a substitute terminal registration table in which a second terminal to be a substitute for a first terminal as a substitute terminal is registered;

a control section, in a case that a third terminal requests said control section to set said communication path in which said first terminal is set as a connection destination, connecting said communication path between said third terminal and said first terminal when setting of said communication path between said third terminal and said first terminal is possible, otherwise connecting said communication path between said third terminal and said second terminal registered in said substitute terminal registration table when setting of said communication path is not possible;

a storage device for recording communication information; and wherein when said communication path is established between said third terminal and said second terminal, said control section stores information sent from said third terminal to said second terminal into said storage device, and informs said first terminal of said information stored in said storage device after communication between said third terminal and said second terminal is completed.

6. An ATM exchange connected to a plurality of transmission paths respectively connected to terminals, comprising:

a switch section having a communication path set therein to connect one terminal to another terminal and transmitting a cell sent from said one terminal to said another terminal through said communication path;

a substitute terminal registration table in which a second terminal to be a substitute for a first terminal as a substitute terminal is registered;

a control section, in a case that a third terminal requests said control section to set said communication path in which said first terminal is set as a connection destination, connecting said communication path between said third terminal and said first terminal when setting of said communication path between said third terminal and said first terminal is possible, otherwise connecting said communication path between said third terminal and said second terminal registered in said substitute terminal registration table when setting of said communication path is not possible;

a transfer time registration table in which a period capable of establishing said communication path between said third terminal and said second terminal is registered when an establishment of said communication path in which said first terminal is set as a connection destination is requested by said third terminal; and wherein said control section establishes said communication path between said third terminal and said second terminal as long as a time at which an establishment of said communication path, in which said first terminal is set as said connection destination, is requested by said third terminal lies within said period registered in said transfer time registration table.

7. An ATM exchange connected to a plurality of transmission paths respectively connected to terminals, comprising;

a switch section having a communication path set therein to connect one terminal to another terminal and transmitting a cell sent from said one terminal to said another terminal through said communication path;

a substitute terminal registration table in which a second terminal to be a substitute for a first terminal as a substitute terminal is registered;

a control section, in a case that a third terminal requests said control section to set said communication path in which said first terminal is set as a connection destination, connecting said communication path between said third terminal and said first terminal when setting of said communication path between said third terminal and said first terminal is possible, otherwise connecting said communication path between said third terminal and said second terminal registered in said substitute terminal registration table when setting of said communication path is not possible;

wherein when said control section is requested to change a connection destination of said communication path for said third terminal to said first terminal after establishing said communication path between said third terminal and said second terminal, said control section establishes a communication path between said third terminal and said first terminal and establishes a communication path between said first terminal and said second terminal.

* * * * *